US011892681B2

(12) United States Patent
Huang et al.

(10) Patent No.: US 11,892,681 B2
(45) Date of Patent: Feb. 6, 2024

(54) FIBER TO CHIP COUPLER AND METHOD OF MAKING THE SAME

(71) Applicant: TAIWAN SEMICONDUCTOR MANUFACTURING COMPANY, LTD., Hsinchu (TW)

(72) Inventors: Chen-Hao Huang, Hsinchu (TW); Hau-Yan Lu, Hsinchu (TW); Sui-Ying Hsu, Hsinchu (TW); Yuehying Lee, Hsinchu (TW); Chien-Ying Wu, Hsinchu (TW); Chien-Chang Lee, Hsinchu (TW); Chia-Ping Lai, Hsinchu (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 0 days.

(21) Appl. No.: 17/446,244

(22) Filed: Aug. 27, 2021

(65) Prior Publication Data

US 2023/0061940 A1 Mar. 2, 2023

(51) Int. Cl.
G02B 6/34 (2006.01)
G02B 6/30 (2006.01)
G02B 6/42 (2006.01)

(52) U.S. Cl.
CPC ............... *G02B 6/34* (2013.01); *G02B 6/30* (2013.01); *G02B 6/4204* (2013.01)

(58) Field of Classification Search
CPC .......... G02B 6/34; G02B 6/30; G02B 6/4204; G02B 6/02123; G02B 6/29317
See application file for complete search history.

(56) References Cited

U.S. PATENT DOCUMENTS

2016/0091664 A1\* 3/2016 Doany .................... G02B 6/34
385/37
2017/0115456 A1\* 4/2017 Sugama ................. G02B 6/305
2022/0269006 A1\* 8/2022 Chern .................... G02B 6/124

\* cited by examiner

*Primary Examiner* — Michael P Mooney
(74) *Attorney, Agent, or Firm* — Hauptman Ham, LLP

(57) ABSTRACT

A coupling system includes an optical fiber configured to carry an optical signal. The coupling system further includes a chip in optical communication with the optical fiber. The chip includes a substrate. The chip further includes a grating on a first side of the substrate, wherein the grating is configured to receive the optical signal. The chip further includes an interconnect structure over the grating on the first side of the substrate, wherein the interconnect structure defines a cavity aligned with the grating. The chip further includes a first polysilicon layer on a second side of the substrate, wherein the second side of the substrate is opposite to the first side of the substrate.

20 Claims, 17 Drawing Sheets

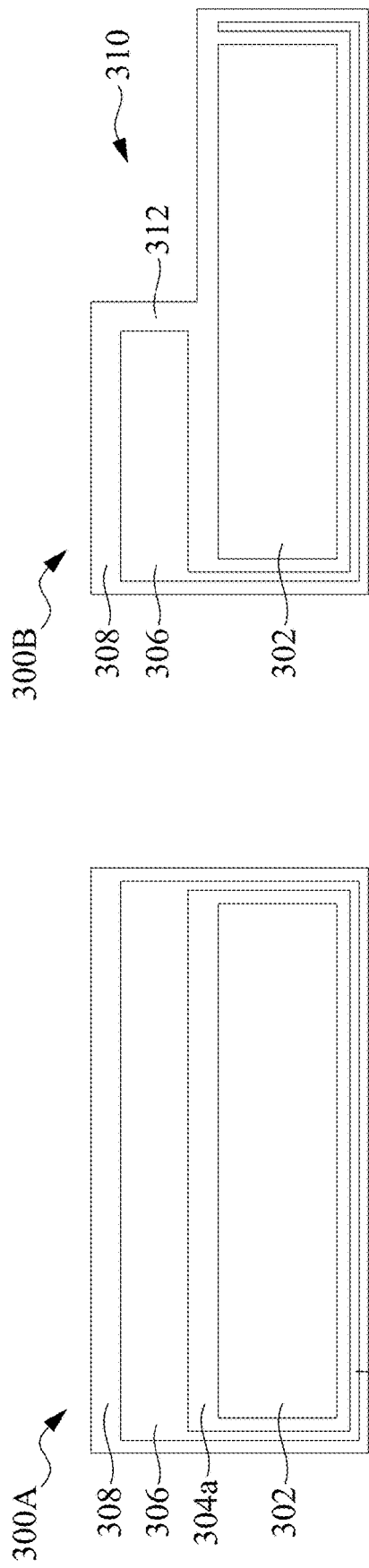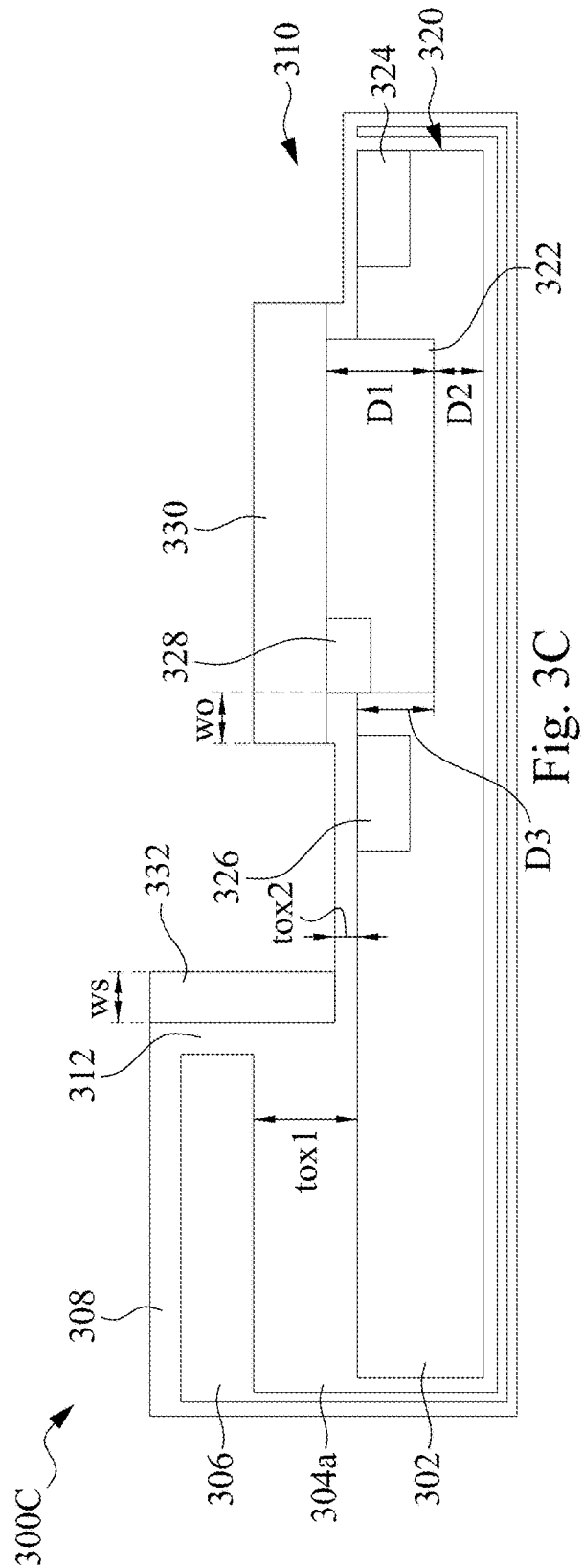
Fig. 3A
Fig. 3B
Fig. 3C

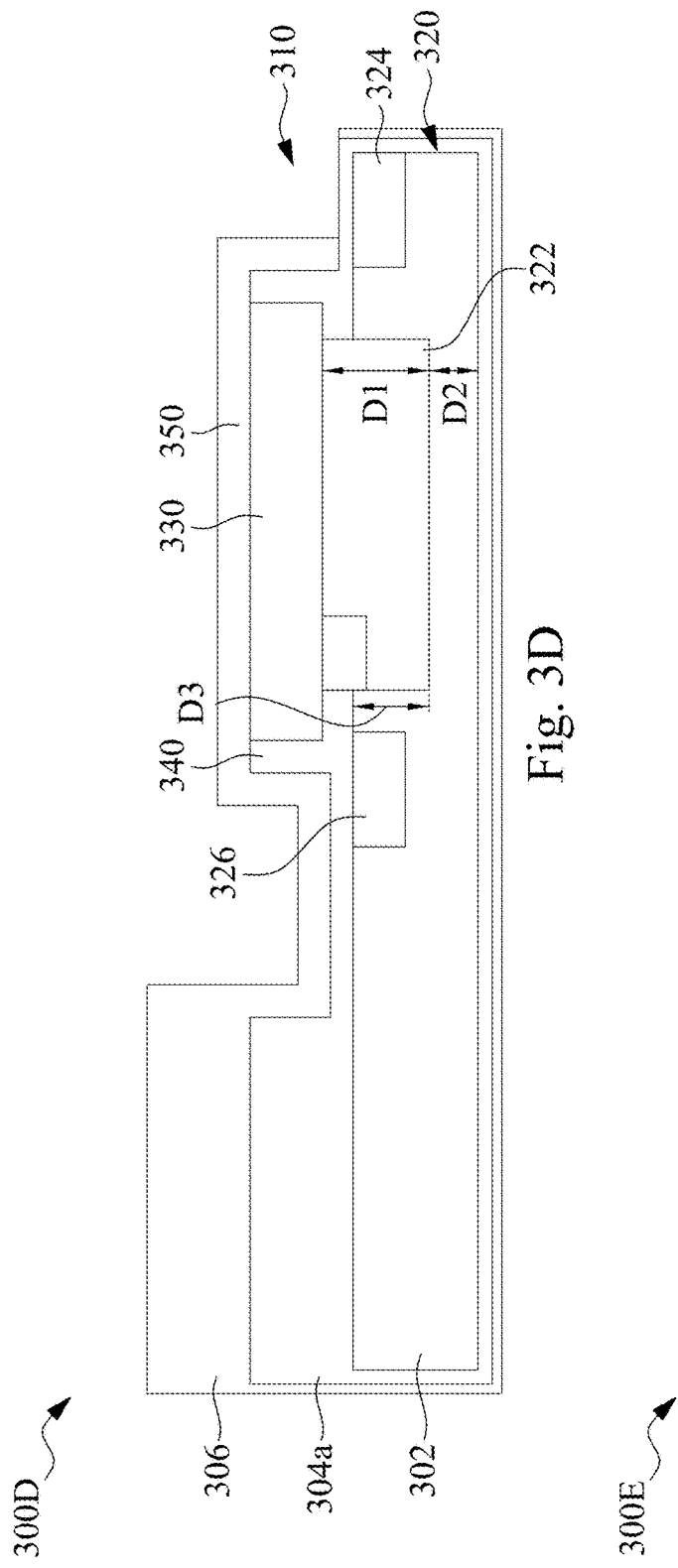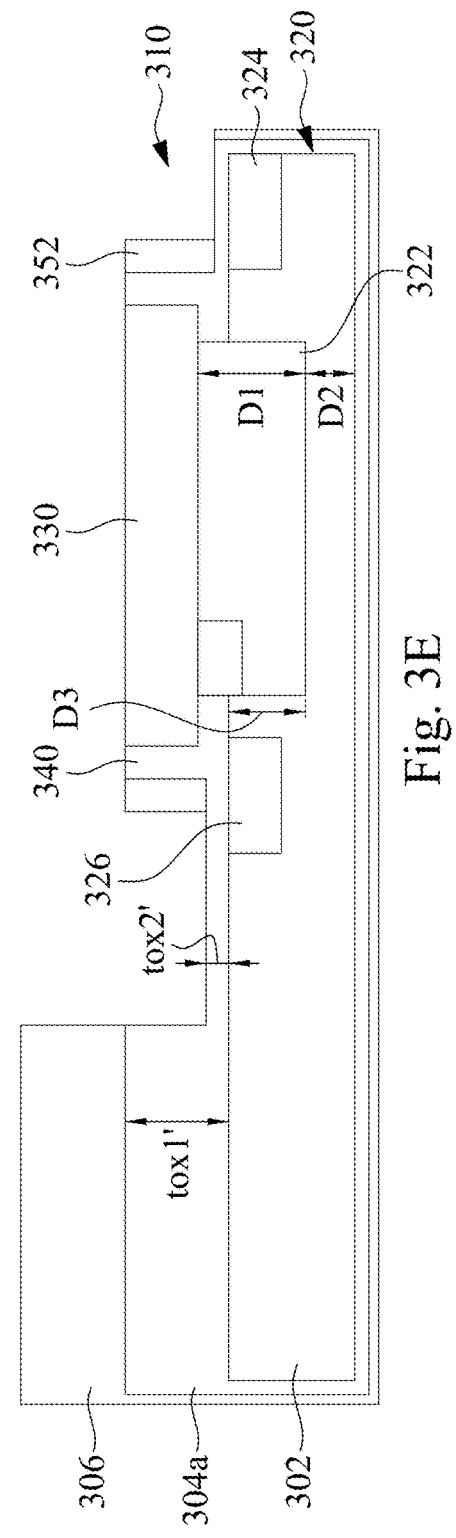

FIBER TO CHIP COUPLER AND METHOD OF MAKING THE SAME

BACKGROUND

Optical gratings are usable for directing optical signals between a chip and an optical fiber. Optical gratings are usable for directing optical signals from the chip to the optical fiber as well as directing optical signals from the optical fiber to the chip. The ability of the optical grating to effectively couple the chip to the optical fiber is based on alignment between the optical signal and the optical grating.

A cavity is formed in the layers of the chip between the optical fiber and the optical grating in order to reduce signal loss for the optical signal passing through the layers of the chip. The signal loss is due to absorption, reflection, refraction, etc. During formation of the cavity, a risk of over-etching, which damages a waveguide in the chip, is possible. In addition, charge accumulates in the substrate during the etching process.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIGS. 3A-3E are cross sectional views of a chip during various stages of manufacture in accordance with some embodiments.

DETAILED DESCRIPTION

Figure 1:
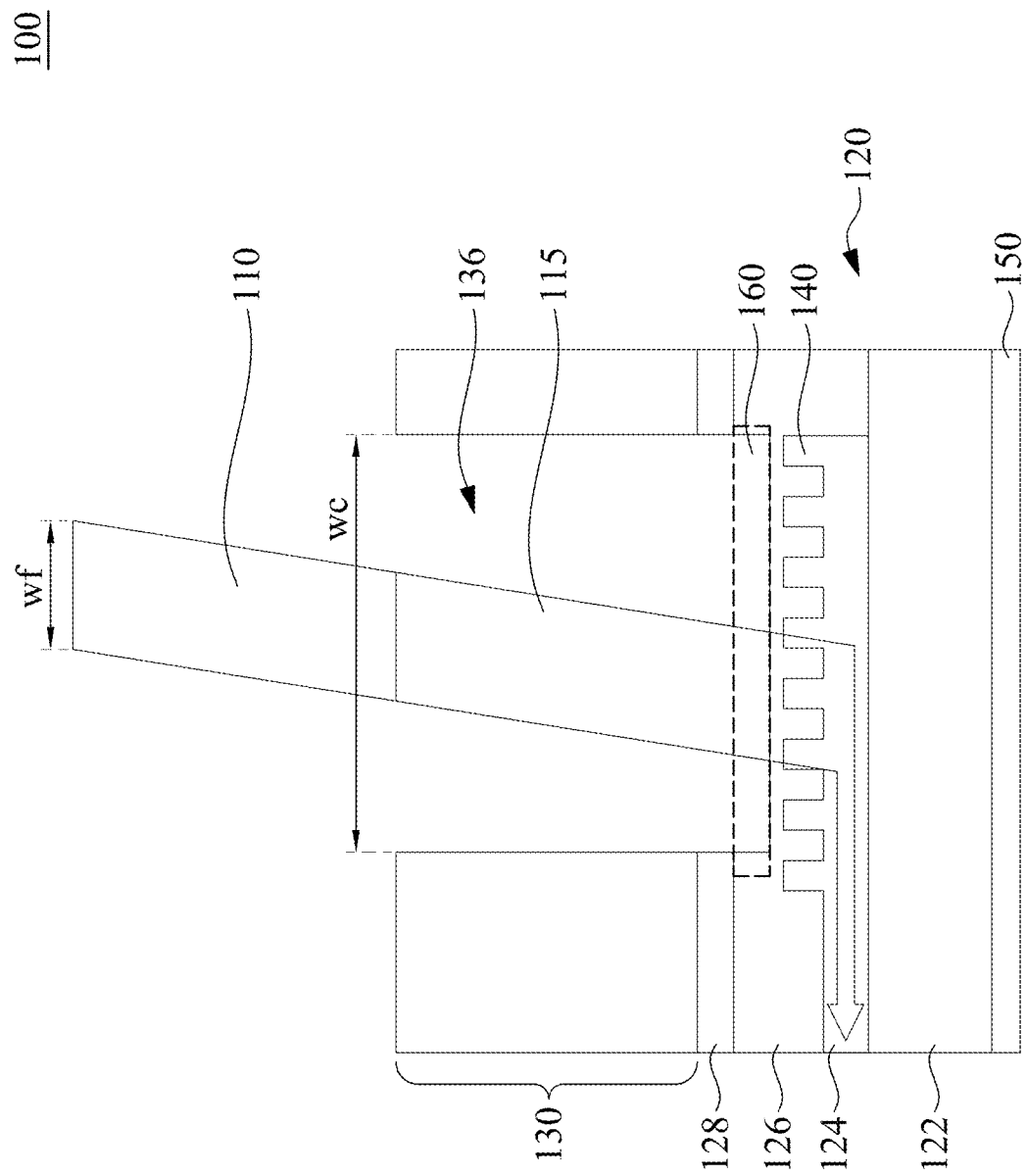
FIG. 1 is a cross sectional view of a fiber to chip coupling system in accordance with some embodiments.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. In optoelectrical devices, an optical signal is used to convey a signal between different electrical components. The optical signal is carried by an optical fiber between the electrical components. In order to couple the optical signal into a chip, a grating coupler is used to receive the optical signal and couple the signal into the waveguide to be transferred to an optoelectronic component for converting the optical signal into an electrical signal.

As the optical signal passes through various layers of the chip, the optical signal is subject to absorption, reflection, refraction and other dispersive phenomena that reduces the strength and consistency of the optical signal. A cavity is defined in the chip above the grating coupler in order to maximize a strength and consistency of the optical signal that reaches the grating coupler. The cavity is formed by an etching process, such as reactive ion etching (RIE). During the etching process, there is a risk of over-etching resulting in damage to the waveguide layer within the chip. Damage to the waveguide layer increases a risk that the optical signal is unable to reach the optoelectronic components or that the strength of the optical signal is reduced based on refraction or reflection at the damaged locations of the waveguide layer.

In addition, charge accumulates in the substrate during the etching process. Charge accumulation is especially problematic in silicon-on-insulator (SOI) substrates, where the charge accumulates within the insulating layers, such as silicon oxide. Charge accumulation weakens the substrate and increases a risk of the substrate breaking.

The current disclosure includes a polysilicon layer over at least a portion of the waveguide layer. The polysilicon layer functions as an etch stop layer to reduce the risk of over-etching damaging the waveguide layer. The current disclosure also includes a polysilicon layer on a backside of the substrate, opposite from the cavity, in order to help to reduce charge accumulation. The backside polysilicon layer helps to conduct charge from insulating materials into the ambient environment or to a ground. As a result, a risk of the substrate breaking due to charge accumulation is reduced.

FIG. 1 is a cross sectional view of a fiber to chip coupling system 100 in accordance with some embodiments. System 100 includes an optical fiber 110 configured to emit an optical signal 115. System 100 further includes a chip 120. Chip 120 includes a substrate 122. A waveguide layer 124 is over the substrate 122. An inter-layer dielectric (ILD) 126 is over the waveguide layer 124. An etch stop layer 128 is over the ILD 126. An interconnect structure 130 is over the etch stop layer 128. One of ordinary skill in the art would recognize that the interconnect structure 130 includes multiple inter-metal dielectric (IMD) layers and conductive layers in order to electrically connect different components of the chip 120. A cavity 136 extends through the interconnect structure 130, the etch stop layer 128 and a portion of the ILD 126. A grating 140 extends from the waveguide layer 124 and is configured to receive the optical signal 115 passing through the cavity 136, any remaining portion of the interconnect structure 130, the etch stop layer 128 and the ILD 126. The grating 140 is configured to direct the optical signal 115 into the waveguide layer 124 to components within the chip 120. The system 100 further includes a polysilicon layer 150 on a surface of the substrate 122 opposite to the cavity 136. The polysilicon layer 150 helps to release charge that accumulates in the substrate 122 during the etching to form the cavity 136. In some embodiments, the system 100 includes a polysilicon layer 160 over the grating 140. The polysilicon layer 160 acts as an etch stop layer during formation of the cavity 136 and helps to reduce the risk of damage to the grating 140 or the waveguide layer 124 due to over-etching. One of ordinary skill in the art would recognize that additional layers, such as cladding and reflective layers, would be included in the system 100.

The optical fiber 110 is a single mode optical fiber having a width wf ranging from about 8 microns (μm) to about 12 μm. In some embodiments, the optical fiber 110 is a multimode optical fiber having a width wf ranging from about 45 μm to about 70 μm. The width wf is based on a size of a core of the optical fiber 110 including any additional cladding or cover layers. If the width wf is too large, then the size of the optical fiber 110 is unnecessarily increased. If the width wf is too small, then there is a risk of loss of optical signal from the core or interference of the optical signal from external light sources. The optical fiber 110 is configured to convey the optical signal 115 from an external device to chip 120. The optical fiber 110 is aligned with the cavity 136 in order for the optical signal 115 to efficiently couple to the grating 140.

The optical signal 115 has a wavelength. In some embodiments where the optical fiber 110 is a single mode fiber, the wavelength of the optical signal 115 ranges from about 1260 nanometers (nm) to about 1360 nm. In some embodiments where the optical fiber 110 is a multimode optical fiber, the wavelength of the optical signal 115 ranges from about 770 nm to about 910 nm. The wavelength of the optical signal 115 is based on a light source used to generate the optical signal. In some embodiments where the optical fiber 110 is a single mode optical fiber, the light source is a laser or a laser diode. In some embodiments where the optical fiber 110 is a multimode optical fiber, the light source of the optical fiber is a light emitting diode (LED). The optical signal 115 will diverge upon exiting the optical fiber 110.

The chip 120 includes at least one optoelectronic component, such as a laser driver, digital control circuit, photodetectors, waveguides, small form-factor pluggable (SFP) transceiver, High-speed phase modulator (HSPM), calibration circuit, distributed Mach-Zehnder Interferometer (MZI), grating couplers, light sources, (i.e., laser), etc. The optoelectronic component is configured to receive the optical signal 115 from the waveguide layer 124 and convert the optical signal 115 into an electrical signal. While the description of FIG. 1 is written as the chip 120 receiving the optical signal 115 from the optical fiber 110, one of ordinary skill in the art would understand that the system 100 is also usable to transfer an optical signal from the chip 120 to the optical fiber 110. That is, the optoelectronic component generates the optical signal, which is then transferred to the optical fiber 110 through the waveguide layer 124 and the grating 140, in some embodiments.

In some embodiments, substrate 122 includes an elementary semiconductor including silicon or germanium in crystal, polycrystalline, or an amorphous structure; a compound semiconductor including silicon carbide, gallium arsenic, gallium phosphide, indium phosphide, indium arsenide, and indium antimonide; an alloy semiconductor including SiGe, GaAsP, AlInAs, AlGaAs, GaInAs, GaInP, and GaInAsP; any other suitable material; or combinations thereof. In some embodiments, the alloy semiconductor substrate has a gradient SiGe feature in which the Si and Ge composition change from one ratio at one location to another ratio at another location of the gradient SiGe feature. In some embodiments, the alloy SiGe is formed over a silicon substrate. In some embodiments, substrate 122 is a strained SiGe substrate. In some embodiments, the semiconductor substrate has a semiconductor on insulator structure, such as a silicon on insulator (SOI) structure. In some embodiments, the semiconductor substrate includes a doped epi layer or a buried layer. In some embodiments, the compound semiconductor substrate has a multilayer structure, or the substrate includes a multilayer compound semiconductor structure.

The waveguide layer 124 is configured to direct the optical signal 115 from the grating 140 to an optoelectronic component of the chip 120. The waveguide layer 124 includes an optical transparent material. In some embodiments, the waveguide layer 124 includes silicon. In some embodiments, the waveguide layer 124 includes plastic. In some embodiments, the waveguide layer 124 includes a same material as the grating 140. In some embodiments, the waveguide layer 124 includes a different material from the grating 140. In some embodiments, the waveguide layer 124 is integral with the grating 140. In some embodiments, the waveguide layer 124 is a slab waveguide, a planar waveguide or a light pipe. In order for the grating 140 to effectively couple the optical signal 115 into the waveguide layer 124, the grating 140 redirects the incident optical signal 115 into an angle of acceptance of the waveguide layer 124. The angle of acceptance of the waveguide layer 124 is based on the wavelength of the optical signal, the frequency of the optical signal and dimensions of the waveguide layer 124. The ILD 126 includes a dielectric material. Contacts are formed through the ILD 126 to electrically connect the optoelectronic component to the interconnect structure 130 and to other components within the chip or to external devices. The ILD 126 is deposited on the substrate 122 using chemical vapor deposition, physical vapor deposition, or another suitable deposition process. In some embodiments, the ILD 126 has a thickness ranging from about 500 nm to about 3000 nm. If the thickness is too great, an aspect ratio for forming the contacts through the ILD 126 makes reliable manufacturing difficult and absorption of the optical signal 115 reduces the strength of the optical signal to an unacceptable level, in some instances. If the thickness is too small, the ILD 126 fails to provide sufficient electrical insulating between conductors, such as conductive layer 134, and other components in the chip 120. In some embodiments, the ILD 126 includes dielectric materials, such as Si, $Si_3N_4$, $SiO_2$ (e.g., quartz, and glass), Al2O3, and H2O, according to various embodiments of the present disclosure. The etch stop layer 128 is over the ILD 126 and has a different etch chemistry from the ILD 126 and the IMD layer 132. In some embodiments, the etch stop layer 128 is deposited using chemical vapor deposition or another suitable deposition process. In some embodiments, the etch stop layer 128 includes SiC $Si_3N_4$, or another suitable material. In some other embodiments, the etch stop layer 128 has a thickness in a range of about 250 nm to about 350 nm. If the thickness of the etch stop layer 128 is too great, then material is wasted and absorption of the optical signal 115 reduces the strength of the optical signal to an unacceptable level, in some instances. If the thickness of the etch stop layer 128 is too small, then a risk of etching through the etch stop layer 128 during the formation of the cavity 136 or formation of electrical connections between the ILD 126 and the conductive layer 134 increases, in some instances.

The interconnect structure 130 is configured to electrically connect the optoelectronic component to other components within the chip 120 or to external devices, for example, through chip bonding. The interconnect structure includes multiple IMD layers and multiple conductive layer.

The IMD layers includes a dielectric material. The IMD layers provide electrical insulation between the conductive layers and other conductive elements within the chip 120, such as the contacts in the ILD 126. The IMD layers are deposited using chemical vapor deposition, physical vapor deposition, or another suitable deposition process. In some embodiments, the IMD layers have a thickness ranging from about 1,000 angstroms to about 30,000 angstroms. If the thickness is too great, an aspect ratio for forming the electrical connections through the IMD layers makes reliable manufacturing difficult, in some instances. If the thickness is too small, the IMD layers fail to provide sufficient electrical insulating between conductors, and other components in the chip 120. In some embodiments, the IMD layers include dielectric materials, such as Si, $Si_3N_4$, $SiO_2$ (e.g., quartz, and glass), Al2O3, and H2O, according to various embodiments of the present disclosure. In some embodiments, the IMD layers include a low-k dielectric material. In some embodiments, the IMD layers include a same material as the ILD 126. In some embodiments, the IMD layers include a different material from the ILD 126.

The conductive layers are configured to convey electrical signals to various components in the chip 120, for example the optoelectronic component. In some embodiments the conductive layers include a seed layer. In some embodiments, the conductive layers include copper, aluminum, tungsten, alloys thereof or another suitable material.

The cavity 136 reduces an amount of material that the optical signal 115 passes through before being directed into the waveguide layer 124 by the grating 140. The cavity 136 extends through the interconnect structure 130, the etch stop layer 128 and through a portion of the ILD 126. In some embodiments, the cavity 136 extends through a portion of the interconnect structure 130. In some embodiments, the cavity 136 extends through less than all of the etch stop layer 128. The sidewalls of the cavity 136 are substantially vertical. In some embodiments, the sidewalls of the cavity 136 are tapered. In some embodiments, a width wc of the cavity ranges from about 2.5-times to about 3.5-times more than the width wf of the optical fiber 110. In some embodiments, the width wc ranges from about 25 μm to about 35 μm. This width wc helps to account for misalignment between the optical fiber 110 and the cavity 136. The width wc also helps to permit the entire optical signal 115 to pass through the cavity 136 even though the optical signal 115 will diverge upon exiting from the optical fiber. If the width wc is too small, then misalignment or divergence of the optical signal 115 will increase the risk of loss of a portion of the optical signal 115, in some instances. If the width we is too great, then routing possibilities in the interconnect structure 130 are reduced or an overall size of the chip 120 is increased, in some instances.

The grating 140 is configured to couple the optical signal 115 from the optical fiber 110 into the waveguide layer 124. The grating 140 directs the optical signal 115 based on an incident angle of the optical signal 115 and dimensions of features of the grating 140. In some embodiments, the grating 140 includes a variable grating section. The variable grating section includes grating features having different geometric dimensions. In some embodiments, the variable grating section includes grating features having a variation in width, depth, pitch or combinations thereof. In some embodiments, the grating 140 includes a uniform grating section. The uniform grating section includes grating features having consistent geometric dimensions. The grating 140 includes an optical transparent material. In some embodiments, the grating 140 includes silicon. In some embodiments, the grating 140 includes plastic. In some embodiments, the grating 140 is integral with the waveguide layer 124.

The polysilicon layer 150 helps to release charge that accumulates during the formation of the cavity 136. In some embodiments, the polysilicon layer 150 is undoped. In some embodiments, the polysilicon layer 150 contains dopants. In some embodiments, the polysilicon layer 150 is connected to a ground or reference voltage in order to assist with releasing the accumulated charge. In some embodiments, a thickness of the polysilicon layer 150 ranges from about 1300 angstroms (Å) to about 1600 Å. If the thickness of the polysilicon layer 150 is too small, then a resistance to releasing the accumulated charge increases to an unacceptable level, in some instances. If the thickness of the polysilicon layer 150 is too great, then material is wasted without a noticeable increase in performance and an overall size of the chip 120 needlessly increases, in some instances.

The polysilicon layer 160 acts as an etch stop layer during the formation of the cavity 136 in order to help reduce the risk of over-etching damage to the grating 140 or to the waveguide layer 124. In some embodiments, the polysilicon layer 160 is undoped. In some embodiments, the polysilicon layer 160 contains dopants. In some embodiments, a thickness of the polysilicon layer 160 ranges from about 1300 angstroms (A) to about 1600 A. If the thickness of the polysilicon layer 160 is too small, then risk of over-etching increases, in some instances. If the thickness of the polysilicon layer 160 is too great, then material is wasted without a noticeable increase in performance and an overall size of the chip 150 needlessly increases, in some instances. In some embodiments, the thickness of the polysilicon layer 150 is equal to the thickness of the polysilicon layer 160. In some embodiments, the thickness of the polysilicon layer 150 is different from the thickness of the polysilicon layer 160. In some embodiments, the polysilicon layer 160 is removed during the formation of the cavity. For examples, in some embodiments, following use as an etch stop layer, a subsequent etching process, e.g., a wet etching, is used to remove the polysilicon layer 160.

Figure 2:
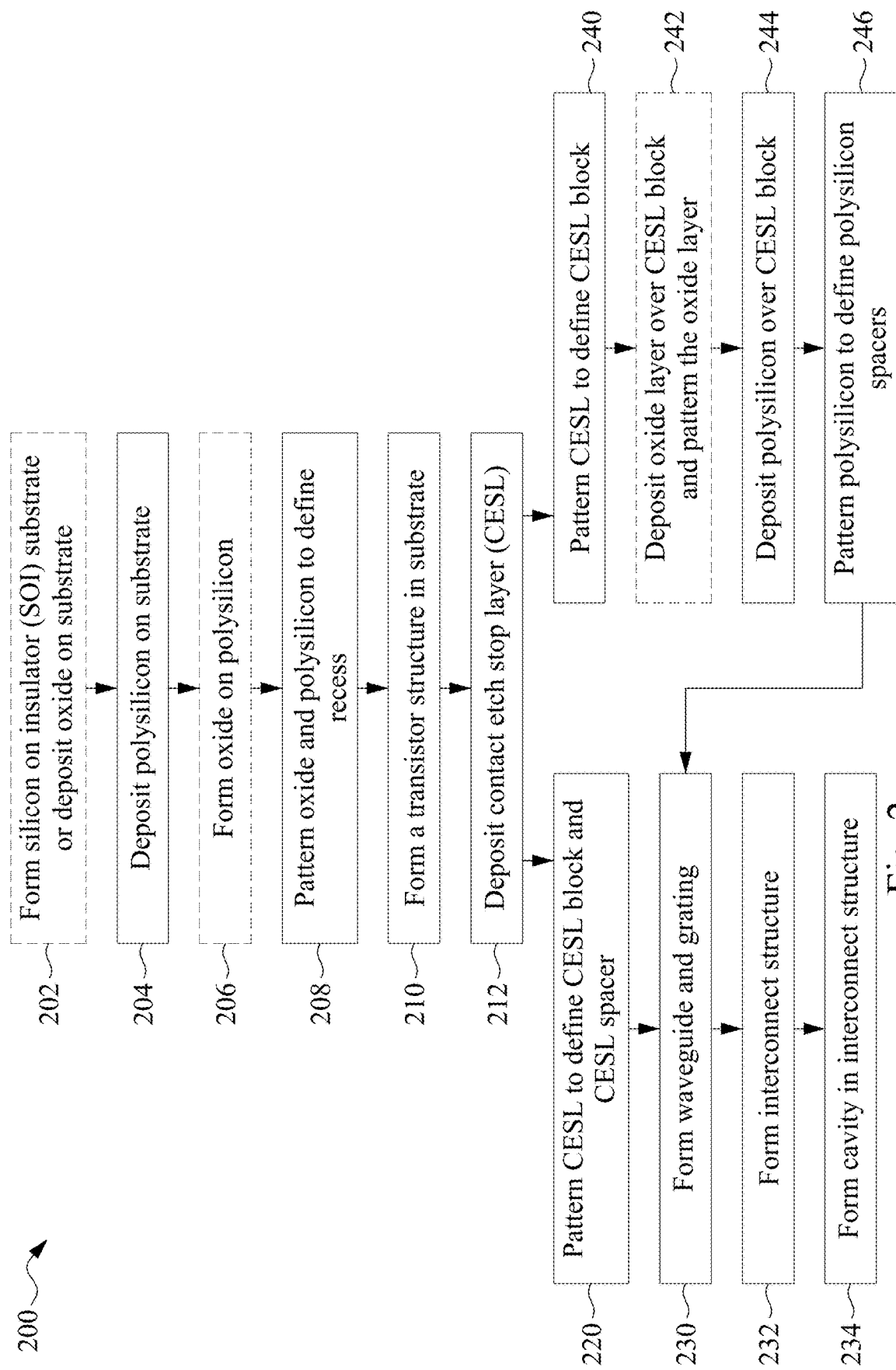
FIG. 2 is a flowchart of a method of making a chip in accordance with some embodiments.

FIG. 2 is a flowchart of a method 200 of making a chip in accordance with some embodiments. Method 200 includes optional operation 202 in which a SOI substrate is formed or an oxide layer is deposited on a substrate. In some embodiments, the oxide layer is formed by oxidizing a silicon substrate using high temperature oxidation (HTO). In some embodiments, the oxide layer is deposited by chemical vapor deposition. In some embodiments, operation 202 is omitted. In some embodiments, operation 202 is omitted because the SOI substrate is provided by an outside vendor.

In operation 204, a polysilicon layer is deposited on the substrate. In embodiments which include operation 202, the polysilicon layer is deposited on the oxide layer. In some embodiments, a thickness of the polysilicon layer ranges from about 1300 A to about 1600 A. If the thickness of the polysilicon layer is too small, then a resistance to releasing the accumulated charge increases to an unacceptable level, in some instances. If the thickness of the polysilicon layer is too great, then material is wasted without a noticeable increase in performance, in some instances. In some embodiments, the polysilicon layer is deposited using low pressure chemical vapor deposition. In some embodiments, the polysilicon is deposited using a silane gas precursor. In some embodiments, the precursor gas is has a concentration ranging from about 15 volume percent to about 40 volume percent with respect to the total volume of the CVD precursor gas with the remaining volume percent portion nitrogen gas. If the concentration of the precursor gas is too low, then the formation process duration is increased, in some instances. If the concentration of the precursor gas is too high, then material is wasted without a noticeable increase in performance, in some instances. In some embodiments, the deposition process is carried out at a pressure of about 100 milliTorr to about 1 Torr. If the pressure is too low, then the formation process duration is increased, in some instances. If the pressure is too high, then material is wasted without a noticeable increase in performance, in some instances. In some embodiments, the deposition process is carried out at a temperature ranging from about 250° C. to about 650° C. If the temperature is too low, then the formation process duration is increased, in some instances. If the temperature is too high, then a risk of reemission of the deposited material increases, in some instances.

In optional operation 206, an oxide layer is formed on the polysilicon layer. In some embodiments, the polysilicon layer is partially oxidized in order to form the oxide layer. In some embodiments, the polysilicon layer is oxidized using HTO at a temperature ranging from about 700° C. to about 820° C. If the temperature is too low, then the formation process duration is increased, in some instances. If the temperature is too high, then a risk of consuming too much of the polysilicon layer to permit releasing of accumulated charge increases, in some instances. In some embodiments, the oxide layer is deposited on the polysilicon layer. In some embodiments, the oxide layer is deposited using chemical vapor deposition. In some embodiments, operation 206 is omitted. In some embodiments, operation 206 is omitted if an oxide space is later formed, see operation 242 below.

FIG. 3A is a cross sectional view of a chip 300A following operation 206 in accordance with some embodiments. The chip 300A includes a substrate 302. A top oxide layer 304a is over a top surface of the substrate 302 and a bottom oxide layer 304b is on a bottom surface of the substrate 302. In some embodiments, a thickness of the top oxide layer 304a ranges from about 400 A to about 600 A. If the thickness of the top oxide layer 304a is too high, material is wasted without a noticeable increase in performance and a size of the chip 300A is needlessly increased, in some instances. If the thickness of the top oxide layer 304a is too small, then the top oxide layer 304a fails to provide sufficient insulation between a polysilicon layer 306 and the substrate 302. In some embodiments, a thickness of the bottom oxide layer 304b ranges from about 1.5 microns (µm) to about 2.5 µm. If the thickness of the bottom oxide layer 304b is too high, material is wasted without a noticeable increase in performance and a size of the chip 300A is needlessly increased, in some instances. If the thickness of the bottom oxide layer 304b is too small, then the bottom oxide layer 304b fails to provide sufficient insulation between a polysilicon layer 306 and the substrate 302.

The polysilicon layer 306 surrounds the substrate 302, top oxide layer 304a and bottom oxide layer 304b. While FIG. 3A shows an upper portion of the polysilicon layer 306 is thicker than a lower portion of the polysilicon layer 306, polysilicon layer 306 is conformally deposited. Conformal deposition means that a thickness of the polysilicon layer 306 is substantially uniform on all surfaces. In some embodiments, a thickness of the polysilicon layer 306 ranges from about 1300 A to about 1600 A. If the thickness of the polysilicon layer 306 is too small, then a resistance to releasing the accumulated charge increases to an unacceptable level, in some instances. If the thickness of the polysilicon layer 306 is too great, then material is wasted without a noticeable increase in performance and an overall size of the chip 300A needlessly increases, in some instances.

An oxide layer 308 surrounds the polysilicon layer 306. The oxide layer 308 is conformally formed. In some embodiments, a thickness of the oxide layer 308 ranges from about 50 A to about 70 A. If the thickness of the oxide layer 308 is too small, then protection of the polysilicon layer 306 during subsequent processing is insufficient, in some instances. If the thickness of the oxide layer 308 is too great, then a risk of consuming too much of the polysilicon layer to permit releasing of accumulated charge increases, in some instances Returning to method 200, in operation 208, the oxide layer and the polysilicon layer are patterned to define a recess. In some embodiments, the patterning is performed using a photoresist and photolithography. In some embodiments, the recess is defined using an etching process. In some embodiments, the etching process is a dry etching process. In some embodiments, the etching process is a wet etching process. In some embodiments, the etching process oxidizes a sidewall of the polysilicon layer during formation of the recess. In some embodiments, an additional oxidation process, such as HTO, is performed following the etching process. In some embodiments, a temperature of the oxidation process ranges from about 700° C. to about 820° C. If the temperature is too low, then the oxidation process duration is increased, in some instances. If the temperature is too high, then a risk of consuming too much of the polysilicon layer to permit releasing of accumulated charge increases, in some instances.

FIG. 3B is a cross sectional view of a chip 300B following operation 208 in accordance with some embodiments. In comparison with the chip 300A, the chip 300B includes a recess 310 which a portion of the polysilicon layer 306 and the oxide layer 308 were removed. The chip 300B further includes an oxide spacer 312 on a sidewall of the polysilicon layer 306. In some embodiments, a width of the oxide spacer 312 ranges from about 30 A to about 50 A. If the thickness of the oxide spacer 312 is too small, then protection of the polysilicon layer 306 during subsequent processing is insufficient, in some instances. If the thickness of the oxide spacer 312 is too great, then a risk of consuming too much of the polysilicon layer to permit releasing of accumulated charge increases, in some instances. Formation of oxide spacer 312 will increase the thickness of other oxide layers in the chip 300B, in some instances.

Returning to method 200, in operation 210 a transistor structure is formed in the substrate. In some embodiments, the transistor structure includes a planar transistor. In some embodiments, the transistor structure includes a fin field effect transistor (FinFET). In some embodiments, the transistor structure includes a gate all around (GAA) transistor structure. In some embodiments, the transistor structure is formed by removing a portion of the substrate and growing a germanium feature in the substrate. In some embodiments, source/drain (S/D) features for formed in the substrate. In some embodiments, the S/D features are formed by ion implantation. In some embodiments, the S/D features are formed by recessing the substrate and growing strained S/D features in the recesses. In some embodiments, forming the transistor structure includes forming a lightly doped drain (LDD) region. In some embodiments, the LDD region is formed by ion implantation.

In operation 212, a contact etch stop layer (CESL) is deposited over the substrate and the transistor structure. In some embodiments, the CESL includes silicon nitride, silicon carbide or another suitable material. In some embodiments, the CESL is deposited using chemical vapor deposition. In some embodiments, a thickness of the CESL ranges from about 800 A to about 1,000 A. If the thickness of the CESL is too small, then a risk of inadvertently etching through the CESL increases, in some instances. If the thickness of the CESL is too great, material is wasted without a noticeable increase in performance and a size of the chip is increased needlessly, in some instances. In some embodiments, the CESL is deposited to form a conformal layer. Following operation 212, the method 200 proceeds to either operation 220 or to operation 240.

In operation 220, the CESL is patterned to define a CESL block and a CESL spacer. The CESL block is over a portion of the transistor structure. The CESL spacer covers a sidewall of the oxide spacer formed in operation 208. In some embodiments, the CESL spacer is omitted. The CESL spacer is omitted if the thickness of the oxide spacer is sufficient to avoid being etched through during subsequent processing of the chip.

FIG. 3C is a cross sectional view of a chip 300C following the operation 220 in accordance with some embodiments. In comparison with the chip 300B, the chip 300C includes a transistor structure 320. A CESL block 330 is over a portion of the transistor structure 320. A CESL spacer 332 covers a sidewall of the oxide spacer 312.

The transistor structure 320 includes a channel region 322, a first S/D region 324 on a first side of the channel region 322, a second S/D region 326 on a second side of the channel region 322 opposite the first side. The transistor structure 320 further includes an LDD region 328 overlapping with the channel region 322.

In some embodiments, the channel region 322 includes doped silicon. In some embodiments, the channel region 322 includes germanium. In some embodiments, a distance D1 from a top of the channel region 322 to a bottom of the channel region 322 ranges from about 225 nanometers (nm) to about 275 nm. If the distance D1 is too small, there is an increased resistance within the channel region 322 that prevents efficient signal transfer between the first S/D region 324 and the second S/D region 326, in some instances. If the distance D1 is too large, a risk of shorting the channel region to the polysilicon layer 306 on the bottom surface of the substrate 302 increases, in some instances. In some embodiments, the channel region 322 is separated from the bottom surface of the substrate 302 by a distance D2 ranging from about 90 nm to about 120 nm. If the distance D2 is too small, a risk of shorting the channel region to the polysilicon layer 306 on the bottom surface of the substrate 302 increases, in some instances. If the distance D1 is too large, there is an increased resistance within the channel region 322 that prevents efficient signal transfer between the first S/D region 324 and the second S/D region 326, in some instances. In some embodiments, the channel region 322 extends a distance D3 below the top surface of the substrate 302 ranging from about 150 nm to about 180 nm. If the distance D3 is too small, there is an increased resistance within the channel region 322 that prevents efficient signal transfer between the first S/D region 324 and the second S/D region 326, in some instances. If the distance D3 is too large, a risk of shorting the channel region to the polysilicon layer 306 on the bottom surface of the substrate 302 increases, in some instances.

The first S/D region 324 and the second S/D region 326 include higher dopant concentrations in the substrate 302. In some embodiments, the first S/D region 324 and the second S/D region 326 are strained S/D structures. In some embodiments, the first S/D region 324 has a first dopant type; and the second S/D region 326 has a second dopant type opposite the first dopant type. In some embodiments, the first S/D region 324 and the second S/D region 326 have a same dopant type. The LDD region 328 overlaps with the channel region 322 and helps with switching speed of the transistor structure 320. In some embodiments, the LDD region 328 has a same dopant type as the second S/D region 326.

The CESL block 330 overlaps the channel region 322. In some embodiments, the CESL block 330 partially overlaps at least one of the first S/D region 324 or the second S/D region 326. The CESL block 330 overhangs the channel region by an overhang width wo of at least about 10 nm. If the overhang width wo is too small, then the CESL block 330 fails to provide sufficient protection for the channel region 322 during subsequent processing, in some instances. In some embodiments, the overhang width wo is the same on both sides of the channel region 322. In some embodiments, the overhang width wo is different on the first side of the channel region 322 than on the second side of the channel region 322. In some embodiments, a thickness of the CESL block 330 ranges from about 800 A to about 1,000 A. If the thickness of the CESL block 330 is too small, then a risk of inadvertently etching through the CESL block 330 increases, in some instances. If the thickness of the CESL block 330 is too great, material is wasted without a noticeable increase in performance and a size of the chip is increased needlessly, in some instances.

The CESL spacer 332 covers the sidewall of the oxide spacer 312. In some embodiments, a width ws of the CESL spacer 332 ranges from about 800 A to about 1,000 A. If the width ws of the CESL spacer 332 is too small, then a risk of inadvertently etching through the CESL spacer 332 increases, in some instances. If the thickness of the CESL spacer 332 is too great, material is wasted without a noticeable increase in performance and a size of the chip is increased needlessly, in some instances. In some embodiments, the width ws of the CESL spacer 332 is equal to the thickness of the CESL block 330. In some embodiments, the width ws of the CESL spacer 322 is different from the thickness of the CESL block 330.

In some embodiments, a thickness tox1 of the top oxide layer 304a between the substrate 302 and the polysilicon layer 306 ranges from about 400 A to about 600 A. If the thickness tox1 is too small, a risk of electrical coupling between the substrate 302 and the polysilicon layer 306 increases, in some instances. If the thickness tox1 is too large, then material is wasted without noticeable improvement in performance, in some instances. In some embodiments, a thickness tox2 of the top oxide layer 304 in the recess 310 ranges from about 80 A to about 90 A. If the thickness tox2 is too small, a risk of electrical coupling between the substrate 302 and subsequently formed layers increases, in some instances. If the thickness tox2 is too large, then aspect ratios for contacts to be connected to the first S/D region 324 or the second S/D region 326 increases making manufacturing more difficult, in some instances.

Returning to method 200, in operation 230 a waveguide layer and a grating are formed on the substrate. In some embodiments, the waveguide layer and the grating are independently formed using silicon, plastic or another suitable material. In some embodiments, the waveguide layer and the grating for integral and a single layer is deposited and then patterned to define the grating as part of the waveguide layer. In some embodiments, the silicon is deposited using chemical vapor deposition. In some embodiments, the plastic is deposited using spin on coating, chemical vapor deposition, or another suitable technique. In some embodiments, the grating is patterned using photolithography and etching. In some embodiments, the grating includes a variable grating region. In some embodiments, the grating includes a uniform grating region. In some embodiments, the grating includes a combination of a variable grating region and a uniform grating region.

In operation 232, an interconnect structure is formed over the substrate. The interconnect structure extends over the transistor structure and the grating. The interconnect structure is formed by alternately depositing dielectric layers and etch stop layers. The dielectric layers have a different etch selectivity from the etch stop layers. In some embodiments, the dielectric layers include oxide, silicon nitride, or another low-k dielectric material. In some embodiments, the etch stop layers include silicon nitride, silicon oxide, silicon carbide or another suitable material. In some embodiments, the dielectric layers and the etch stop layers are deposited using chemical vapor deposition.

Conductive elements are formed in the dielectric layers and the etch stop layers in order to electrically connect different components of the chip or to electrically connect a component of the chip to an external device. Openings for the conductive elements are formed in the dielectric layers and the etch stop layers using a series of photolithography and etching processes. In some embodiments, the conductive elements include copper, aluminum, tungsten or another suitable conductive material. In some embodiments, the conductive elements are formed by plating, physical vapor deposition or another suitable process.

In operation 234, a cavity is formed in the interconnect structure. The cavity is aligned with the grating in order to permit light to pass through the cavity to be incident on the grating. The cavity is formed using a series of photolithography and etching processes. In some embodiments, the cavity is formed using a dry etching process where the etchant is selected based on a material being etched. In some embodiments, the cavity extends through an entirety of the interconnect structure. In some embodiments, the cavity extends through less than the entire interconnect structure. In some embodiments, the sidewalls of the cavity are perpendicular to the top surface of the substrate. In some embodiments, the sidewalls of the cavity are tapered. In some embodiments, the width ranges from about 25 μm to about 35 μm. This width helps to account for misalignment between the optical fiber and the cavity. The width also helps to permit the entire optical signal to pass through the cavity even though the optical signal will diverge upon exiting from the optical fiber. If the width is too small, then misalignment or divergence of the optical signal will increase the risk of loss of a portion of the optical signal, in some instances. If the width is too great, then routing possibilities in the interconnect structure are reduced or an overall size of the chip is increased, in some instances.

In some embodiments, the method 200 proceeds from operation 212 to operation 240. In operation 240, the CESL is patterned to define the CESL block. The operation 240 is similar to the operation 220, except that the operation 240 does not form the CESL spacer.

In optional operation 242, an oxide layer is deposited over the CESL block and then patterned to define oxide spacers on sidewalls of the CESL block. In some embodiments, the oxide layer is deposited using chemical vapor deposition. In some embodiments, the oxide layer is patterned using photolithography and etching processes. In some embodiments, a width of the oxide spacer ranges from about 50 A to about 200 A. If the width of the oxide spacer is too small, a risk of electrically connection between later formed polysilicon spacer and a channel region of the transistor structure increases, in some embodiments. If the width of the oxide spacer is too great, material is wasted without a noticeable increase in performance, in some embodiments. Patterning the oxide layer exposes a top surface of the CESL block. In some embodiments, operation 242 is omitted if an overhang width of the CESL block beyond an edge of the channel region of the transistor structure is sufficient to reduce the risk of electrical coupling between the polysilicon spacer and the channel region.

In operation 244, a polysilicon layer is deposited over the CESL block. In some embodiments, a thickness of the polysilicon layer ranges from about 50 A to about 200 A. If the thickness of the polysilicon layer is too small, then the polysilicon layer will not sufficient protect from over-etching, in some instances. If the thickness of the polysilicon layer is too great, then material is wasted without a noticeable increase in performance, in some instances. In some embodiments, the polysilicon layer is deposited using the same process as in operation 204.

FIG. 3D is a cross sectional view of a chip 300D following operation 244 in accordance with some embodiments. In comparison with the chip 300C, the chip 300D does not include the oxide layer 308 (optional operation 206 was not performed) and does not include CESL spacer 332. The chip 300D includes oxide spacers 340 along sidewalls of the CESL block 330. In some embodiments, a width of the oxide spacers 340 ranges from about 50 A to about 200 A. If the width of the oxide spacers is too small, a risk of electrically connection between later formed polysilicon spacer and a channel region of the transistor structure increases, in some embodiments. If the width of the oxide spacers is too great, material is wasted without a noticeable increase in performance, in some embodiments. The chip 300D further includes a polysilicon layer 350 over the CESL block 330 and over the top oxide layer 304a in the recess 310. In some embodiments, a thickness of the polysilicon layer 350 ranges from about 50 A to about 200 A. If the thickness of the polysilicon layer is too small, then the polysilicon layer will not sufficient protect from over-etching, in some instances. If the thickness of the polysilicon layer is too great, then material is wasted without a noticeable increase in performance, in some instances.

Returning to method 200, in operation 246, the polysilicon layer is patterned to define polysilicon spacers. The polysilicon layer is patterned using photolithography and etching processes. In some embodiments, a width of the polysilicon spacers ranges from about 50 A to about 200 A. If the width of the polysilicon spacers are too small, then the polysilicon spacers will not sufficient protect from over-etching, in some instances. If the width of the polysilicon spacers is too great, then material is wasted without a noticeable increase in performance, in some instances.

FIG. 3E is a cross section a chip 300E following operation 246 in accordance with some embodiments. In comparison with the chip 300D, the chip 300E includes polysilicon spacers 352 on an opposite side of the oxide spacers 340 from the CESL block 330. In some embodiments, a width of the polysilicon spacers 352 ranges from about 50 A to about 200 A. If the width of the polysilicon spacers 352 are too small, then the polysilicon spacers will not sufficient protect from over-etching, in some instances. If the width of the polysilicon spacers 352 is too great, then material is wasted without a noticeable increase in performance, in some instances.

In some embodiments, a thickness tox1' of the top oxide layer 304a between the substrate 302 and the polysilicon layer 306 ranges from about 800 A to about 1,000 A. If the thickness tox1' is too small, a risk of electrical coupling between the substrate 302 and the polysilicon layer 306 increases, in some instances. If the thickness tox1' is too large, then material is wasted without noticeable improvement in performance, in some instances. In some embodiments, a thickness tox2' of the top oxide layer 304 in the recess 310 ranges from about 120 A to about 150 A. If the thickness tox2' is too small, a risk of electrical coupling between the substrate 302 and subsequently formed layers increases, in some instances. If the thickness tox2' is too large, then aspect ratios for contacts to be connected to the first S/D region 324 or the second S/D region 326 increases making manufacturing more difficult, in some instances.

Figure 4A:
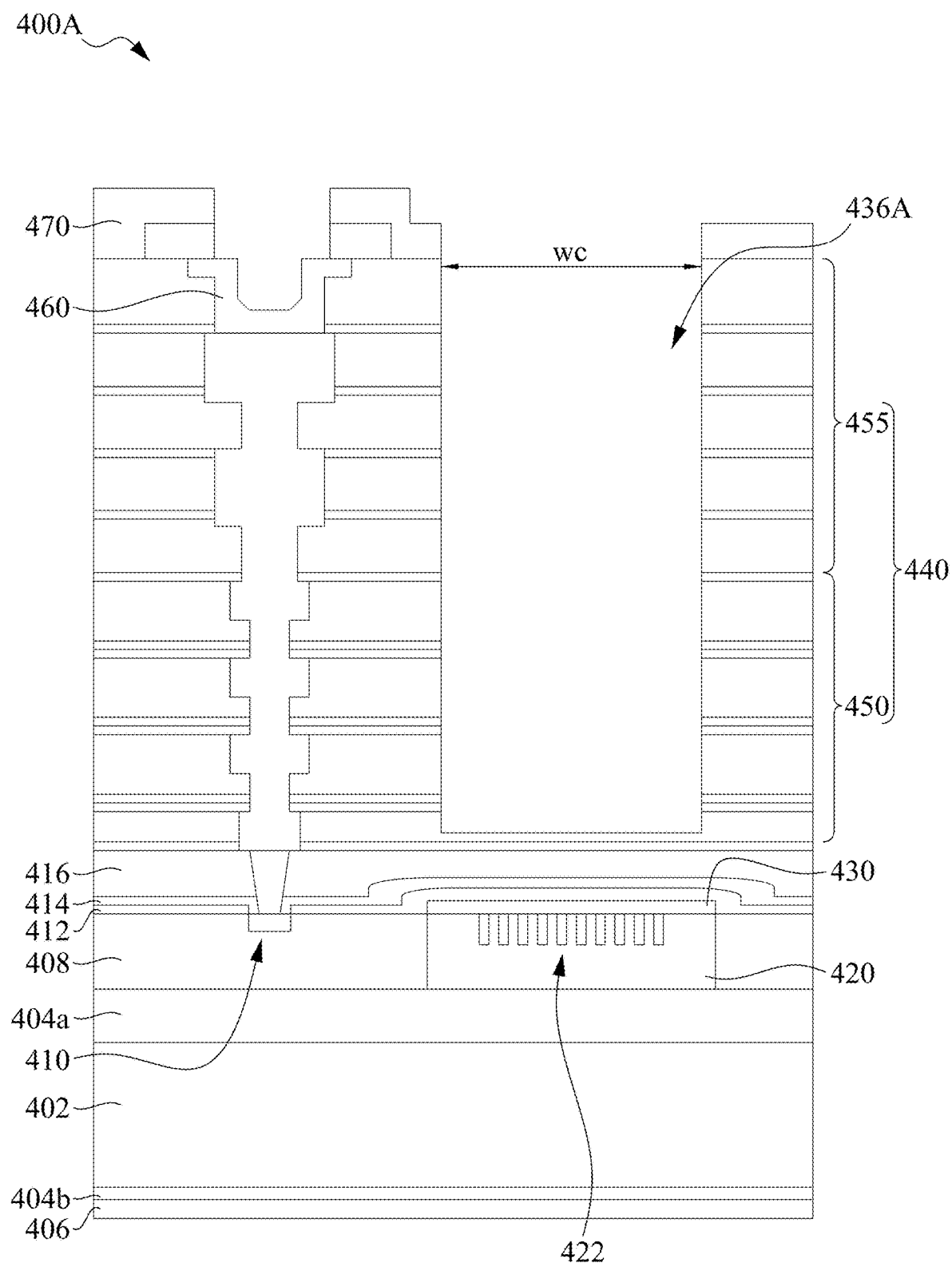
FIGS. 4A-4G are cross sectional views of a chip in accordance with some embodiments.

FIG. 4A is a cross sectional view of a chip 400A in accordance with some embodiments. The chip 400A includes a substrate 402. In some embodiments, the substrate 402 is similar to the substrate 122 (FIG. 1) or the substrate 302 (FIGS. 3A-3E). A top oxide layer 404a is over a top surface of the substrate 402. In some embodiments, the top oxide layer 404a is similar to the top oxide layer 304a (FIGS. 3A-3E). A bottom oxide layer 404b is on a bottom surface of the substrate 402 opposite the top surface. In some embodiments, the bottom oxide layer 404b is similar to the bottom oxide layer 304b (FIGS. 3A-3E). A polysilicon layer 406 is on an opposite side of the bottom oxide layer 404b from the substrate 402. In some embodiments, the polysilicon layer 406 is similar to the polysilicon layer 150 (FIG. 1) or the polysilicon layer 306 (FIGS. 3A-3E). A silicon layer 408 is over the top oxide layer 404a. An implant region 410 is in the silicon layer 408. An oxide layer 412 is over the silicon layer 408. A CESL layer 414 is over the oxide layer 412. In some embodiments, the CESL layer 414 is similar to the CESL layer 128 (FIG. 1). An ILD 416 is over the CESL layer 414. In some embodiments, the ILD 416 is similar to the ILD 126 (FIG. 1). A waveguide layer 420 is defined in the silicon layer 408. In some embodiments, the waveguide layer 420 is similar to the waveguide layer 124 (FIG. 1). A grating 422 is integral with the waveguide layer 420 and is configured to receive an optical signal and couple the optical signal into the waveguide layer 420. In some embodiments, the grating 422 is similar to the grating 140 (FIG. 1). A polysilicon layer 430 is over the waveguide layer 420. In some embodiments, the polysilicon layer 430 is similar to the polysilicon layer 160 (FIG. 1).

An interconnect structure 440 is over the ILD 416. The interconnect structure 440 includes a first interconnect section 450 having conductive features having a first dimension. The interconnect structure 440 further includes a second interconnect section 455 having conductive features having a second dimension greater than the first dimension. The second interconnect section 455 is over the first interconnect section 450. In some embodiments, interconnect structure 440 is similar to the interconnect structure 130 (FIG. 1). A contact pad 460 is electrically connected to the implant region 410 by conductive features in the interconnect structure 440. A passivation layer 470 is over the interconnect structure 440. The chip 400A includes a cavity 436A for optically coupling an optical fiber with the grating 422.

The cavity 436A extends through a portion of the interconnect structure 440. The cavity 436A extends through all of the second interconnect section 455 and through an upper portion of the first interconnect section 450. In some embodiments, a portion of a bottommost IMD layer of the interconnect structure 440 remains as a bottom surface of the cavity 436A. In some embodiments, a remaining portion of the bottommost IMD layer ranges from about 10% to about 90% of the bottommost IMD layer. The amount of the remaining portion of the IMD layer is a result of manufacturing variation during an etching process used to define the cavity 436A.

The silicon layer 408 is usable to form transistor structures, e.g., transistor structure 320 (FIGS. 3C-3E). The silicon layer 408 is also usable to contain the waveguide layer 420. In some embodiments, cladding or reflective layers are between the silicon layer 408 and the waveguide layer 420 in order to avoiding reducing the strength of the optical signal traveling through the waveguide layer 420 due to light leaking to the silicon layer 408. The cladding or reflective layers also help to prevent light from entering the waveguide layer 420 from the silicon layer 408, which would introduce noise into the optical signal within the waveguide layer 420. In some embodiments, a thickness of the silicon layer 408 ranges from about 2,500 A to about 3,000 A. If the thickness of the silicon layer 408 is too small, then an ability to form transistor structures is reduced, in some instances. If the thickness of the silicon layer 408 is too large, material is wasted without a noticeably increase in performance resulting in increasing the size of the chip 400A needlessly.

The implant region 410 is part of a component within the chip 400A. In some embodiments, the implant region 410 is part of an optoelectronic component. In some embodiments, the implant region 410 is part of a transistor structure, e.g., transistor structure 320 (FIGS. 3C-3E). The implant region 410 is not particularly limiting and is used merely to indicate that the interconnect structure 440 provides electrical connection to elements within the chip 400A.

The oxide layer 412 helps to protect the silicon layer 408 during subsequent processing. In some embodiments, the oxide layer 412 is formed by oxidizing the silicon layer 408, e.g., using HTO. In some embodiments, a thickness of the oxide layer 412 ranges from about 50 A to about 200 A. If the thickness of the oxide layer 412 is too small, a risk of damage to the silicon layer 408 during subsequent processing increases, in some embodiments. If the thickness of the oxide layer 412 is too great, material is wasted without a noticeable increase in performance, in some embodiments.

The contact pad 460 provides a location for electrically connecting external devices to the interconnect structure 440. In some embodiments, the contact pad 460 includes aluminum, copper, tungsten or another suitable conductive material. In some embodiments, the contact pad 460 is part of a fan-out connection.

The passivation layer 470 is configured to protect the interconnect structure 440. In some embodiments, the passivation layer 470 includes silicon nitride, silicon oxide, silicon oxynitride, or another suitable dielectric material. In some embodiments, a thickness of the passivation layer 470 ranges from about 5,000 A to about 6,000 A. If the thickness of the passivation layer 470 is too small, a risk of damage to the interconnect structure 440 increases, in some instances. If the thickness of the passivation layer 470 is too great, material is wasted without a noticeable increase in performance and the size of the chip 400A is needlessly increased, in some instances.

The polysilicon layer 430 acts as an etch stop layer over the waveguide layer 420 and the grating 422. The polysilicon layer 430 helps to reduce the risk of over-etching during formation of the cavity 436A. As mentioned above, over-etching that damages the waveguide layer 420 or the grating 422 increases the risk of the chip 400A being unable to effectively transfer an optical signal from an optical fiber to a component within the chip 400A. In some embodiments, a thickness of the polysilicon layer 430 ranges from about 1,400 A to about 1,600 A. If the thickness of the polysilicon layer 430 is too small, then a risk of over-etching damage to the waveguide layer 420 or the grating 422 increases, in some instances. If the thickness of the polysilicon layer 430 is too large, material is wasted without a noticeable improvement in performance which needlessly increases the size of the chip 400A, in some instances. In some embodiments, the polysilicon layer 430 has a same thickness as the polysilicon layer 406. In some embodiments, the polysilicon layer 430 has a different thickness from the polysilicon layer 406.

Figure 4B:
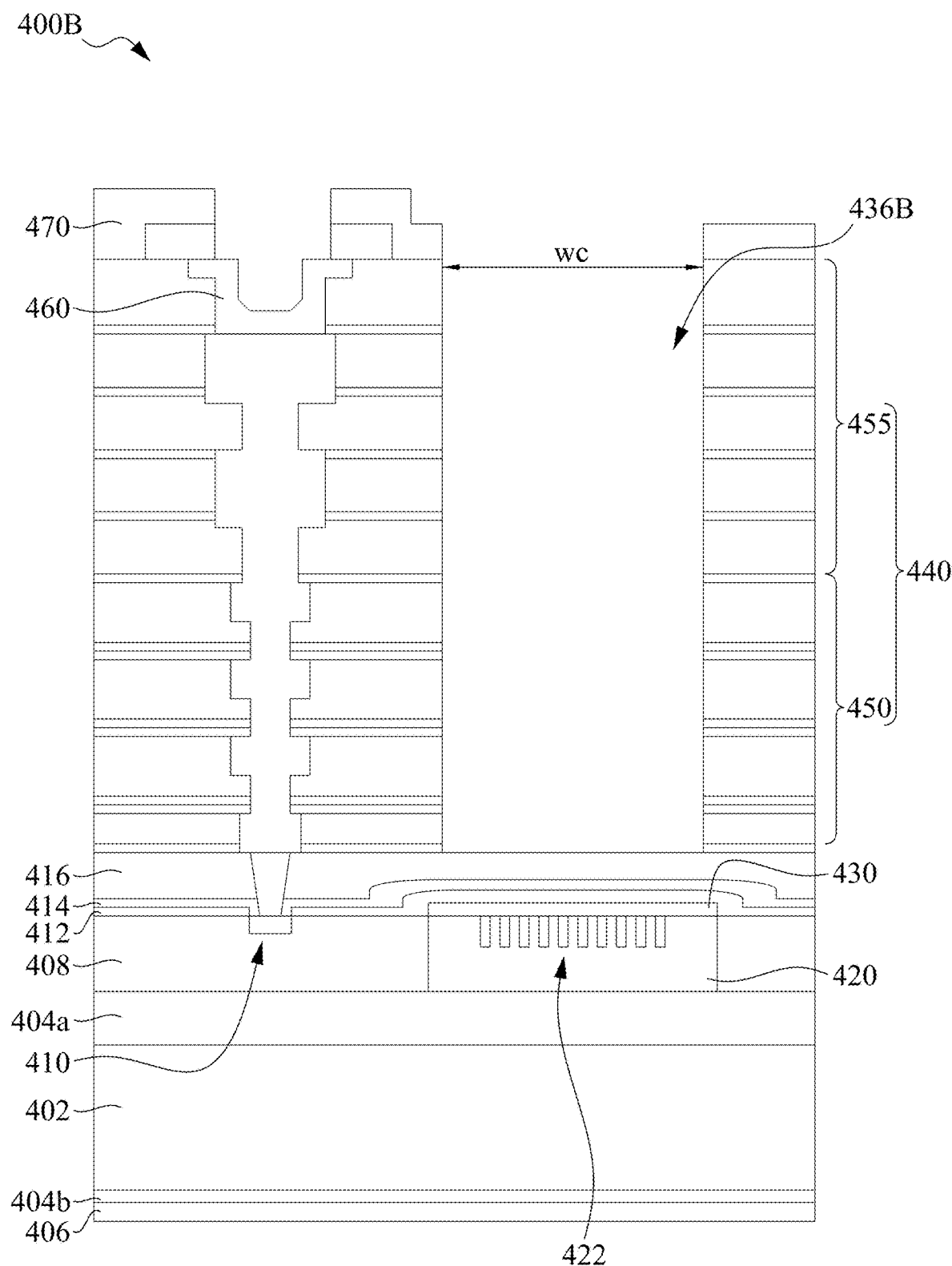

FIG. 4B is a cross sectional view of a chip 400B in accordance with some embodiments. The chip 400B is similar to the chip 400A (FIG. 4A). In comparison with the chip 400A, the chip 400B includes cavity 436B which extends through an entirety of the interconnect structure 440. The cavity 436B extends into the ILD 416. In some embodiments, a portion of the ILD 416 remains as a bottom surface of the cavity 436B. In some embodiments, a remaining portion of the ILD 416 ranges from about 10% to about 90% of the ILD 416. The amount of the remaining portion of the ILD 416 is a result of manufacturing variation during an etching process used to define the cavity 436B. In some embodiments, the cavity 436B extends through the entirety of the ILD 416 and exposes the CESL 414.

Figure 4C:
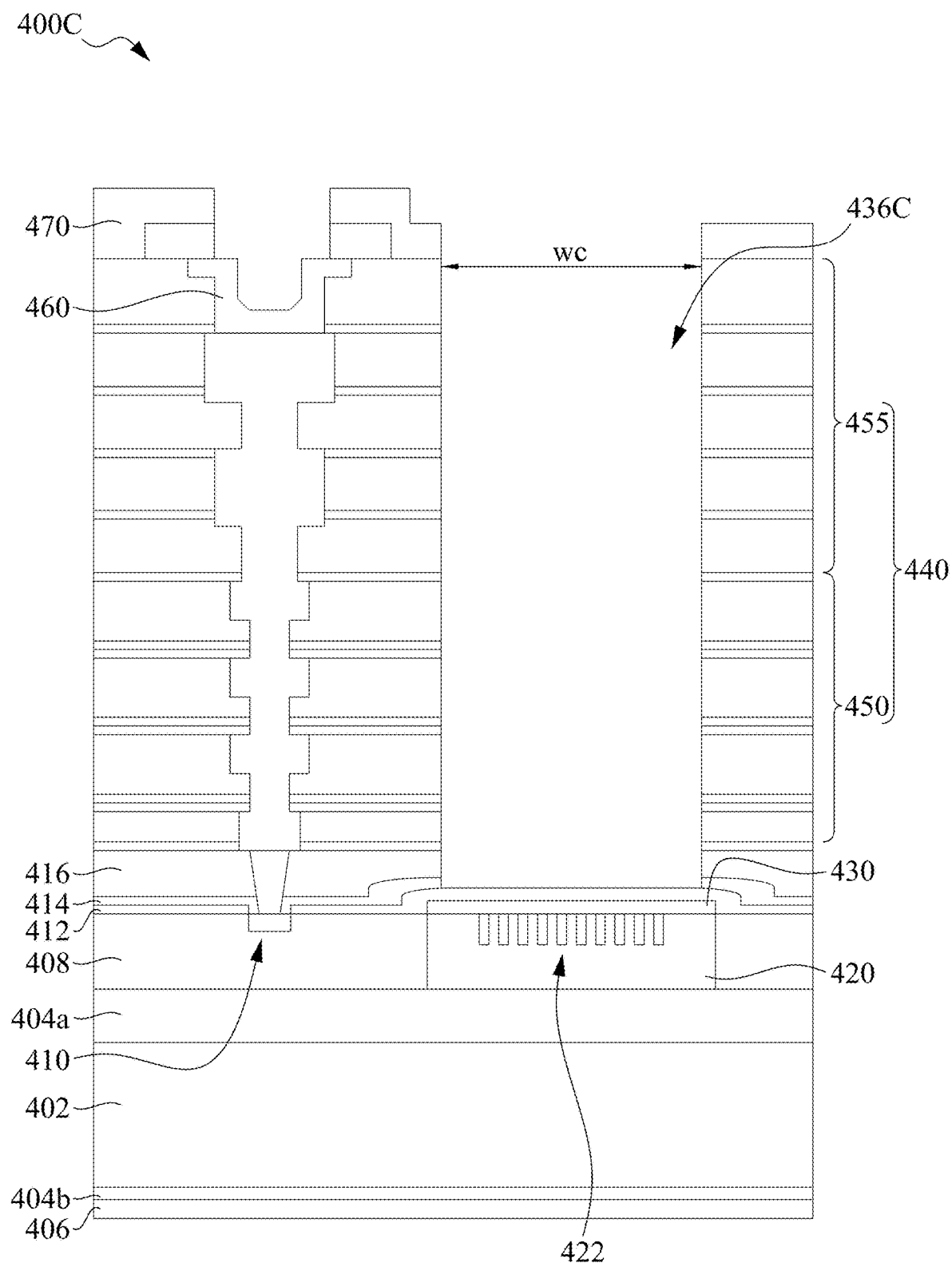

FIG. 4C is a cross sectional view of a chip 400C in accordance with some embodiments. The chip 400B is similar to the chip 400A (FIG. 4A). In comparison with the chip 400A, the chip 400C includes cavity 436C which extends through an entirety of the interconnect structure 440, an entirety of the ILD 416 and an entirety of the CESL 414. The cavity 436C extends into the oxide layer 412. In some embodiments, a portion of the oxide layer 412 remains as a bottom surface of the cavity 436C. In some embodiments, a remaining portion of the oxide layer 412 ranges from about 10% to about 90% of the oxide layer 412. The amount of the remaining portion of the oxide layer 412 is a result of manufacturing variation during an etching process used to define the cavity 436C.

Figure 4D:
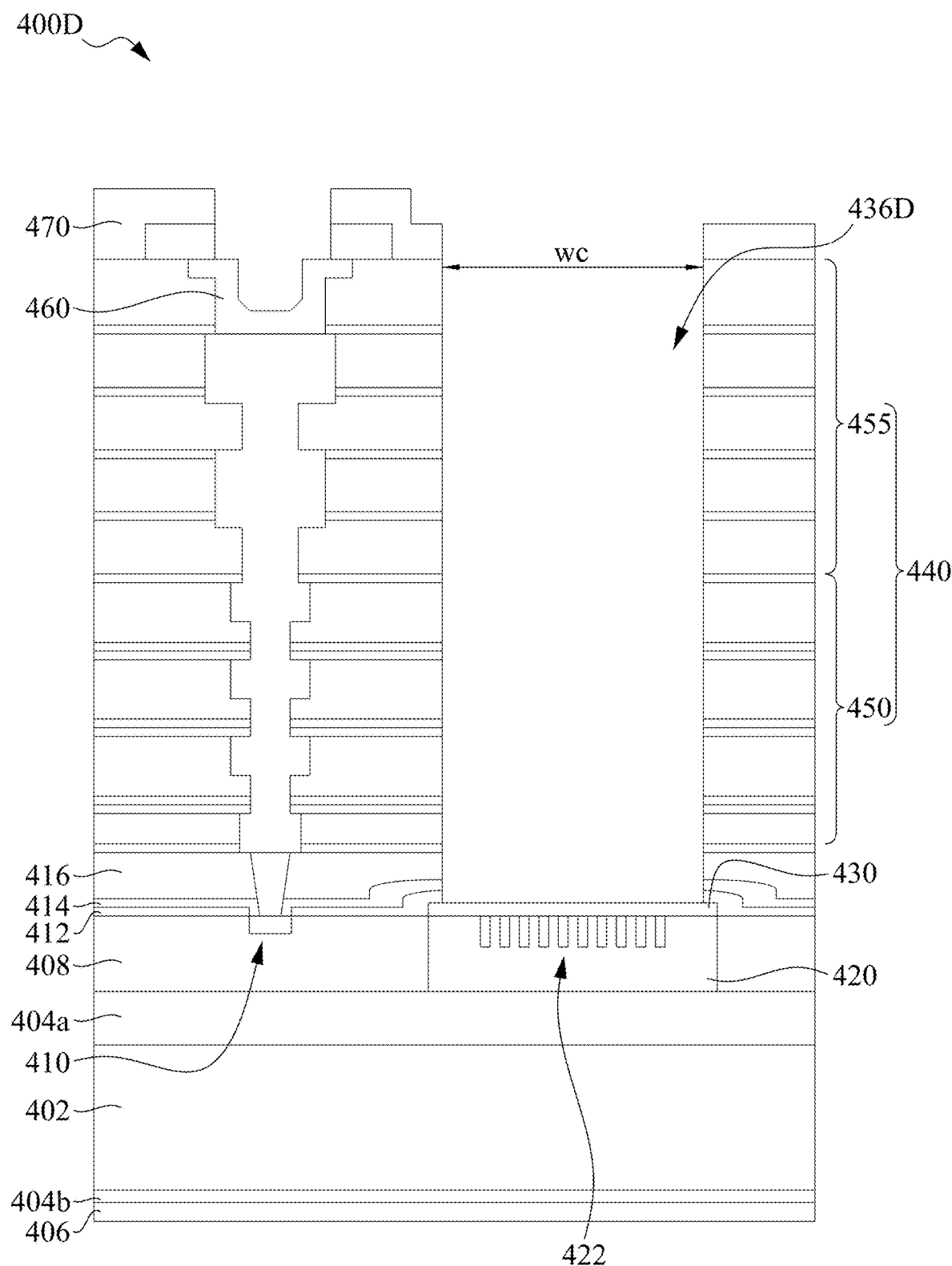

FIG. 4D is a cross sectional view of a chip 400D in accordance with some embodiments. The chip 400D is similar to the chip 400A (FIG. 4A). In comparison with the chip 400A, the chip 400D includes cavity 436D which extends through an entirety of the interconnect structure 440, an entirety of the ILD 416, an entirety of the CESL 414, and an entirety of the oxide layer 412. The cavity 436D extends into the polysilicon layer 430. In some embodiments, a portion of the polysilicon layer 430 remains as a bottom surface of the cavity 436D. In some embodiments, a remaining portion of the polysilicon layer 430 ranges from about 10% to about 90% of the polysilicon layer 430. The amount of the remaining portion of the polysilicon layer 430 is a result of manufacturing variation during an etching process used to define the cavity 436D.

Figure 4E:
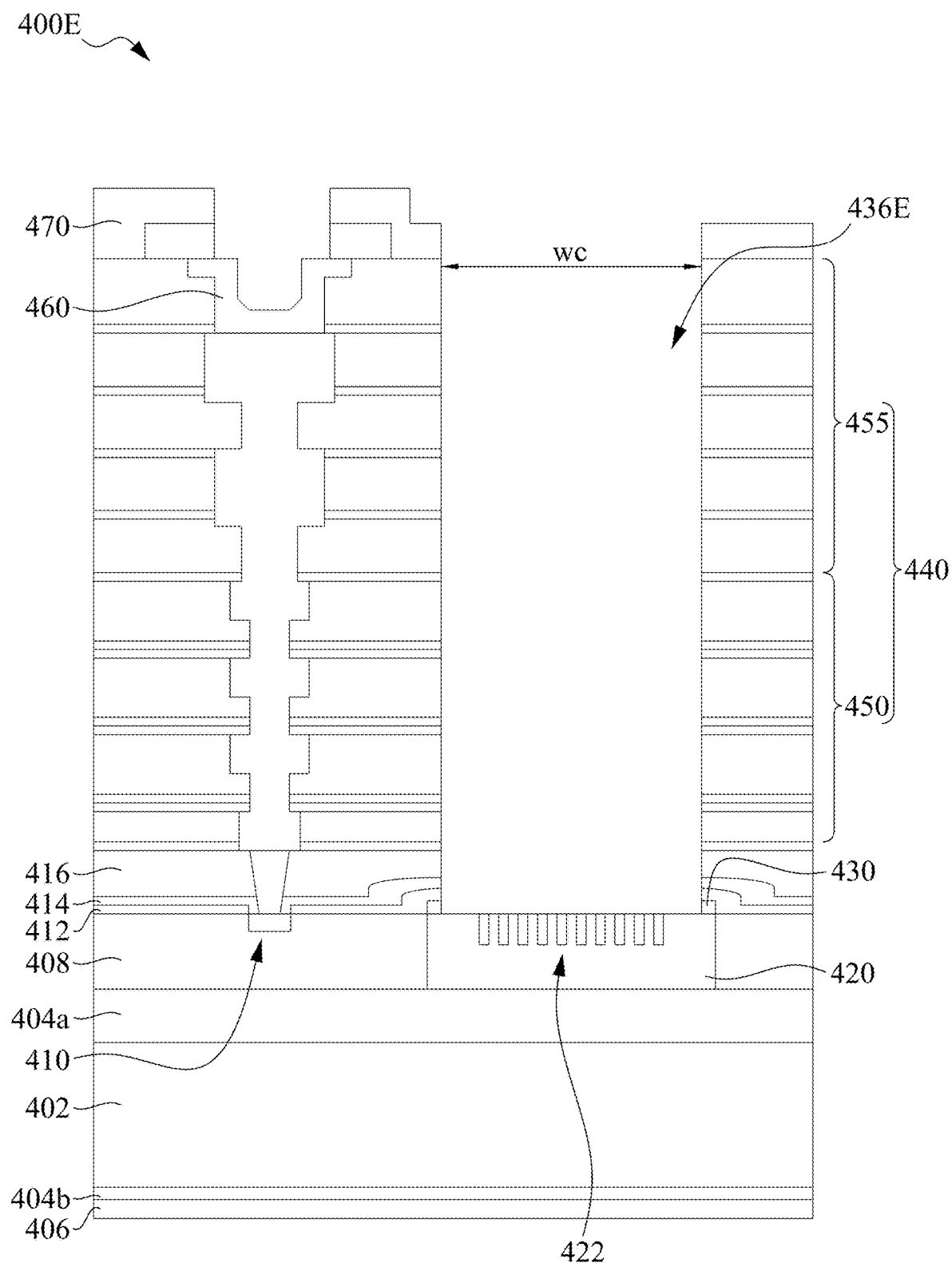

FIG. 4E is a cross sectional view of a chip 400E in accordance with some embodiments. The chip 400E is similar to the chip 400A (FIG. 4A). In comparison with the chip 400A, the chip 400E includes cavity 436E which extends through an entirety of the interconnect structure 440, an entirety of the ILD 416, an entirety of the CESL 414, an entirety of the oxide layer 412, and an entirety of the polysilicon layer 430. The cavity 436E exposes the waveguide layer 420 and the grating 422. A portion of the polysilicon layer 430 remains under the oxide layer 412 outside of the cavity 436E.

Figure 4F:
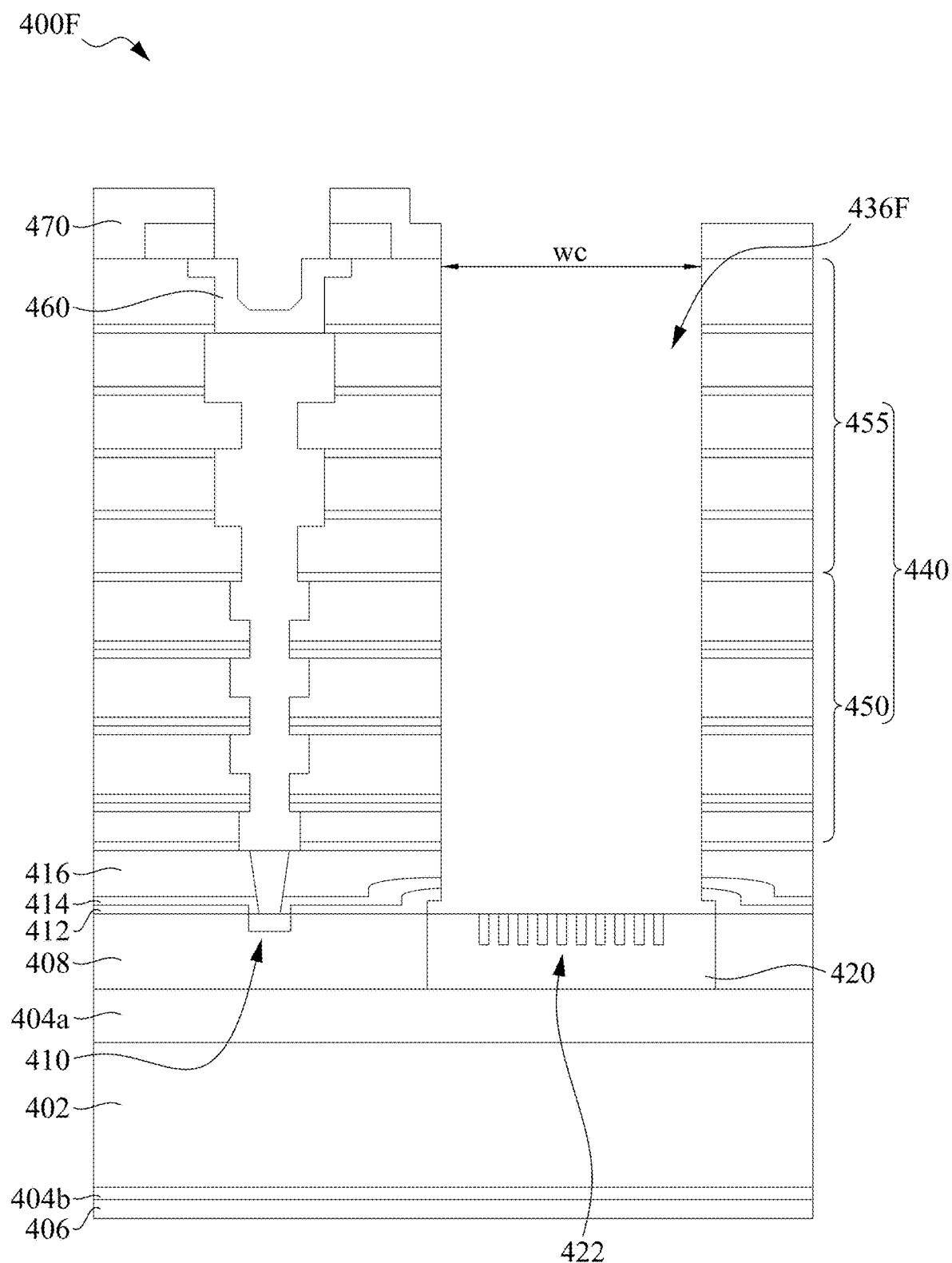

FIG. 4F is a cross sectional view of a chip 400F in accordance with some embodiments. The chip 400F is similar to the chip 400E (FIG. 4E). In comparison with the chip 400E, the chip 400F does not include the portion of the polysilicon layer 430 under the oxide layer 412 outside of the cavity 436F. In some embodiments, a wet etching is used to remove the portion of the polysilicon layer 430 outside of the cavity 436F to define an overhang by the oxide layer 412. Removing this portion of the polysilicon layer 430 increases an amount of the waveguide layer 420 and the grating 422 exposed. Thus, an amount of the waveguide layer 420 and the grating 422 able to receive the optical signal without absorption from other materials is increases. As a result, efficiency of optical coupling between the optical fiber and the waveguide layer 420 is increased.

Figure 4G:
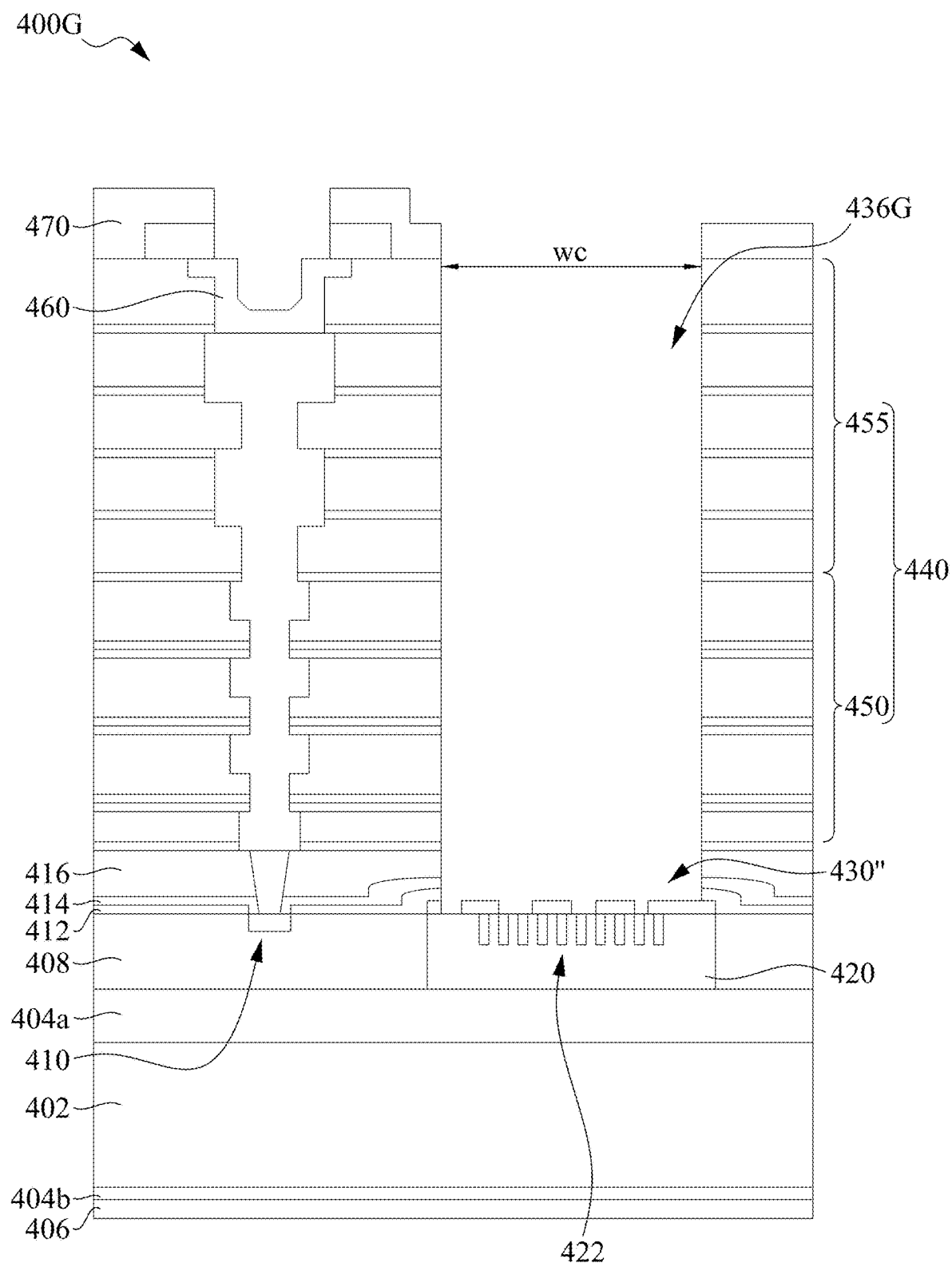

FIG. 4G is a cross sectional view of a chip 400G in accordance with some embodiments. The chip 400G is similar to the chip 400E (FIG. 4E). In comparison with the chip 400E, the chip 400G includes a segmented polysilicon layer 430". During the formation of the chip 400G, the polysilicon layer 430 is etched to define openings to form the segmented polysilicon layer 430". Removing these portions of the polysilicon layer 430 increases an amount of the waveguide layer 420 and the grating 422 exposed. Thus, an amount of the waveguide layer 420 and the grating 422 able to receive the optical signal without absorption from other materials is increases. As a result, efficiency of optical coupling between the optical fiber and the waveguide layer 420 is increased. In some embodiments, the segmented polysilicon layer 430", as a whole, occupies about 20% to about 30% of the cavity width wc of the cavity 436G. If the amount of the cavity width wc occupied by the segmented polysilicon layer 430" is too small, then a risk of over-etching increases because the etching tool is less likely to detect the presence of the segmented polysilicon layer 430" and terminate the etching process, in some instances. If the amount of the cavity width wc occupied by the segmented polysilicon layer 430" is too great, then an amount of light from the optical signal that is absorbed or dispersed by the segmented polysilicon layer 430" increases and coupling efficiency is reduced, in some instances. While the segmented polysilicon layer 430" is only shown with respect to a cavity that extends all the way to the segmented polysilicon layer 430", one of ordinary skill in the art would recognize that the segmented polysilicon layer 430" is usable with any of the embodiments in FIGS. 4A-4F.

The examples of chips 400A-400G (FIGS. 4A-4G) result from different etching depths for the cavities 436A-436G. In some embodiments, due to manufacturing variation, different chips on a same wafer will have cavities from the different examples in FIGS. 4A-4G. For example, in some embodiments, chips on the wafer closer to an edge of the wafer are more likely to have cavities which extend farther into the chip than chips near a center of the wafer.

Figure 5A:
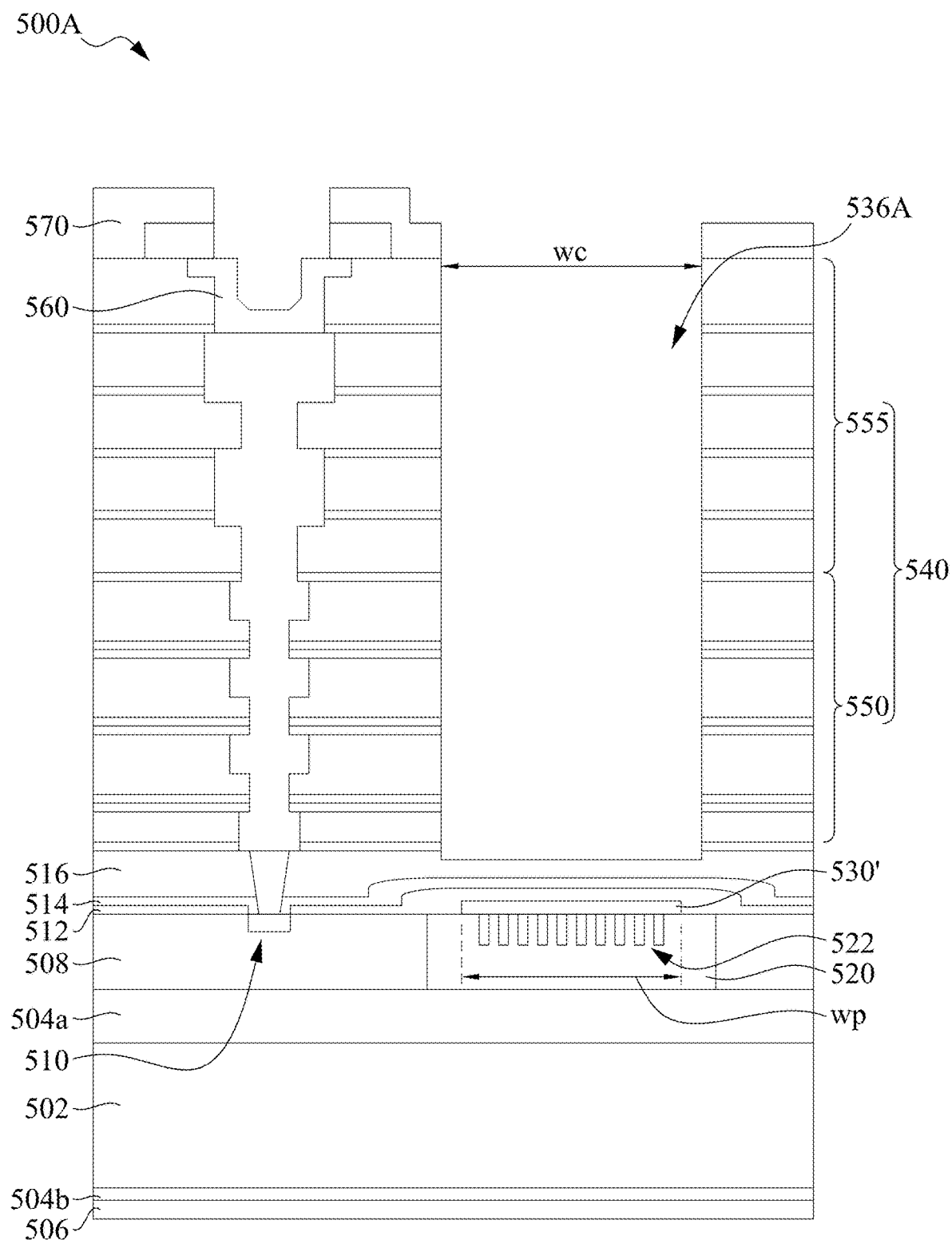
FIGS. 5A-5E are cross sectional views of a chip in accordance with some embodiments.

FIG. 5A is a cross sectional view of a chip 500A in accordance with some embodiments. The chip 500A is similar to the chip 400B (FIG. 4B). Reference numbers for similar elements are increased by 100 with respect to the reference numbers in FIG. 4B. In comparison with the chip 400B, the chip 500A includes a polysilicon layer 530' which has a width wp less than a width of the cavity 536A. In some embodiments, the width wp ranges from about 20% to about 30% of the width wc. If the width wp is too small, then a risk of over-etching increases because the etching tool is less likely to detect the presence of the polysilicon layer 530' and terminate the etching process, in some instances. If the width wp is too great, then an amount of light from the optical signal that is absorbed or dispersed by the polysilicon layer 530' increases and coupling efficiency is reduced, in some instances. While the depth of the cavity 536A is similar to the depth of the cavity 436B (FIG. 4B), one of ordinary skill in the art would recognize that a depth of a cavity similar to the depth of cavity 436A (FIG. 4A) is also possible, in some embodiments. In some embodiments, the cavity 536A extends through the entirety of the ILD 516 and exposes the CESL 514.

Figure 5B:
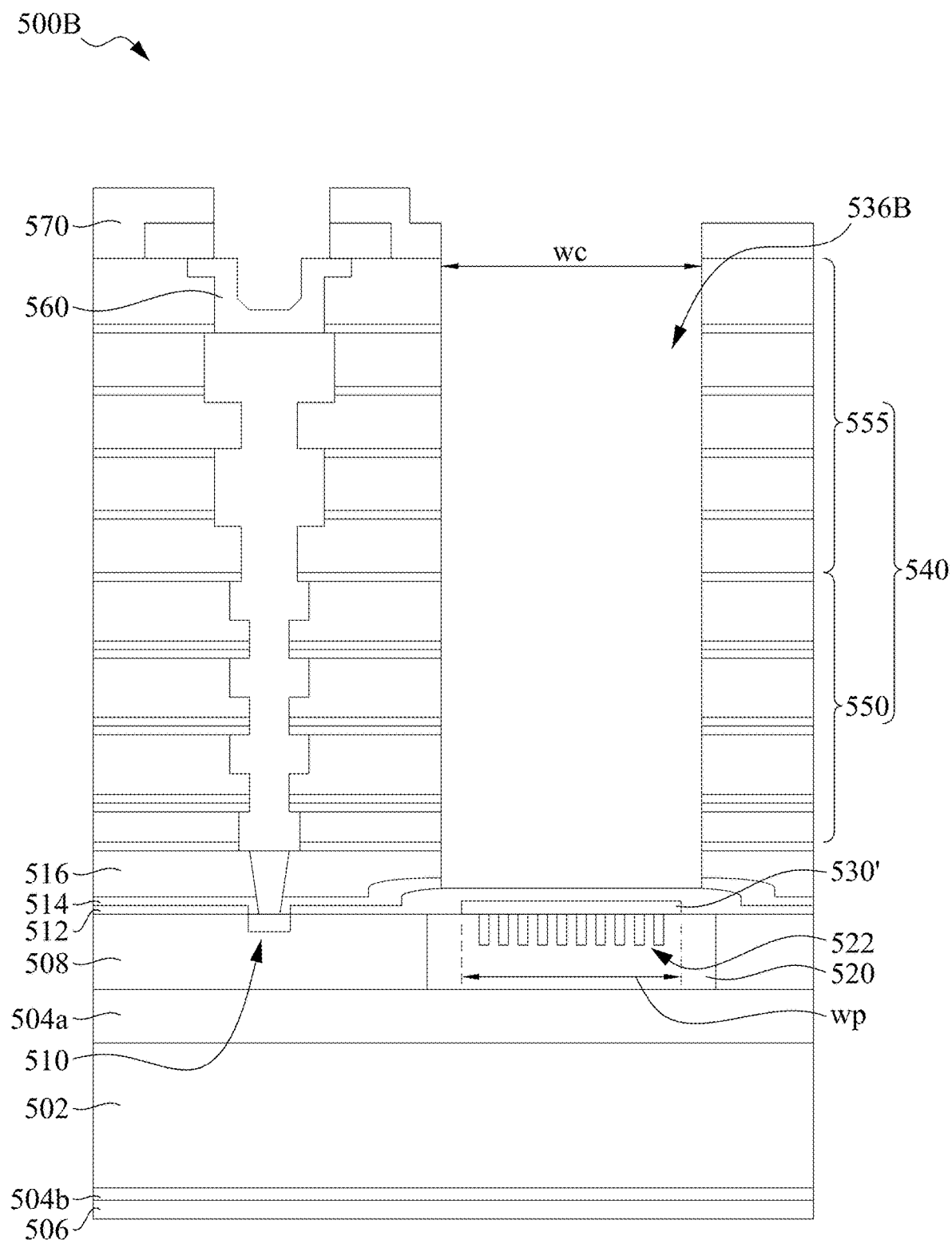

FIG. 5B is a cross sectional view of a chip 500B in accordance with some embodiments. The chip 500B is similar to the chip 500A (FIG. 5A). In comparison with the chip 500A, the chip 500B includes cavity 536B which extends through an entirety of the interconnect structure 540, an entirety of the ILD 516 and an entirety of the CESL 514. The cavity 536B extends into the oxide layer 512. In some embodiments, a portion of the oxide layer 512 remains as a bottom surface of the cavity 536B. In some embodiments, a remaining portion of the oxide layer 512 ranges from about 10% to about 90% of the oxide layer 412. The amount of the remaining portion of the oxide layer 512 is a result of manufacturing variation during an etching process used to define the cavity 536B.

Figure 5C:
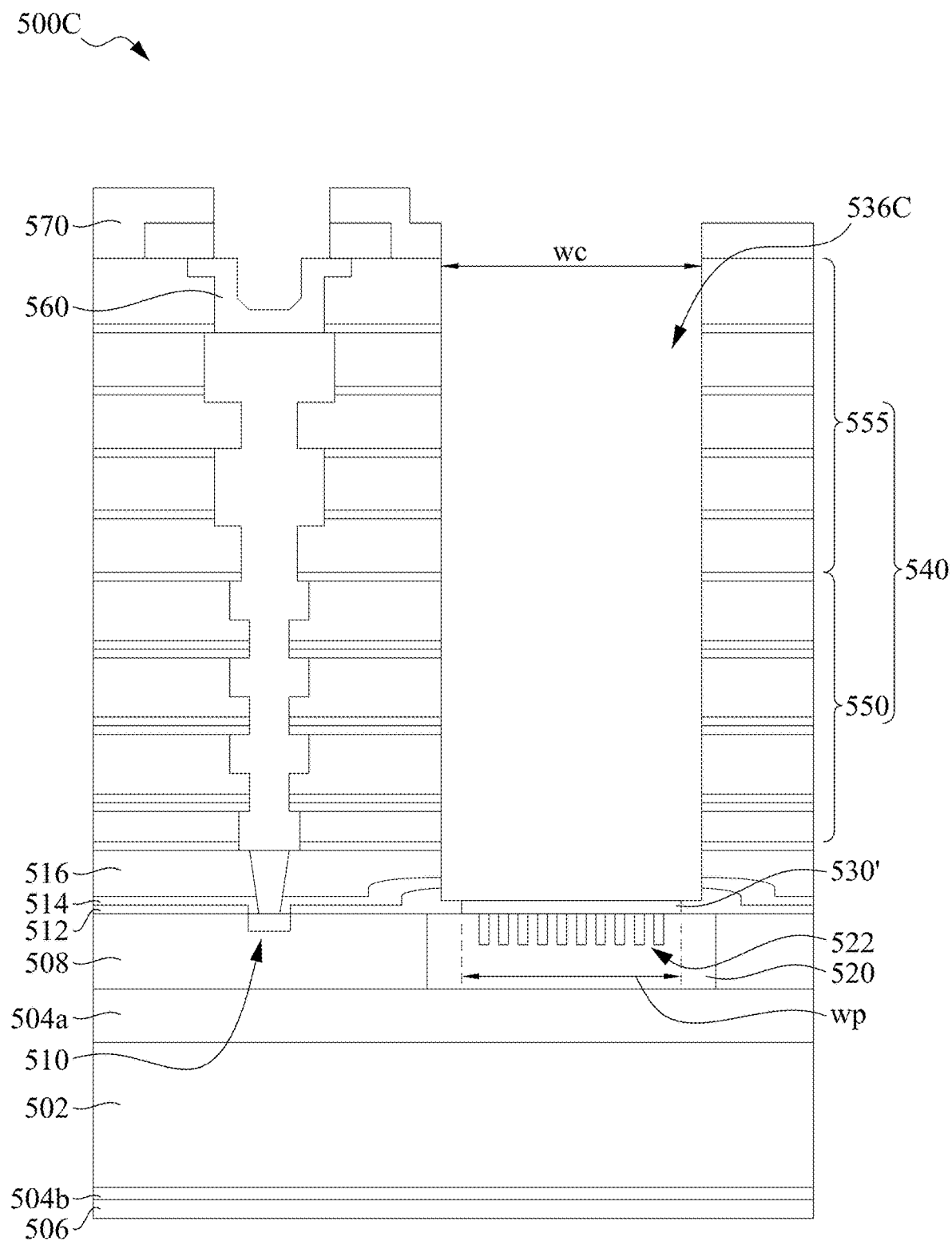

FIG. 5C is a cross sectional view of a chip 500C in accordance with some embodiments. The chip 500C is similar to the chip 500A (FIG. 5A). In comparison with the chip 500A, the chip 500C includes cavity 536C which extends through an entirety of the interconnect structure 540, an entirety of the ILD 516, an entirety of the CESL 514, and an entirety of the oxide layer 512 above the polysilicon layer 530'. The cavity 536C extends into the polysilicon layer 530'. In some embodiments, a portion of the polysilicon layer 530' remains as a bottom surface of the cavity 536C. In some embodiments, a remaining portion of the polysilicon layer 530' ranges from about 10% to about 90% of the polysilicon layer 430. The amount of the remaining portion of the polysilicon layer 530' is a result of manufacturing variation during an etching process used to define the cavity 536C.

Figure 5D:
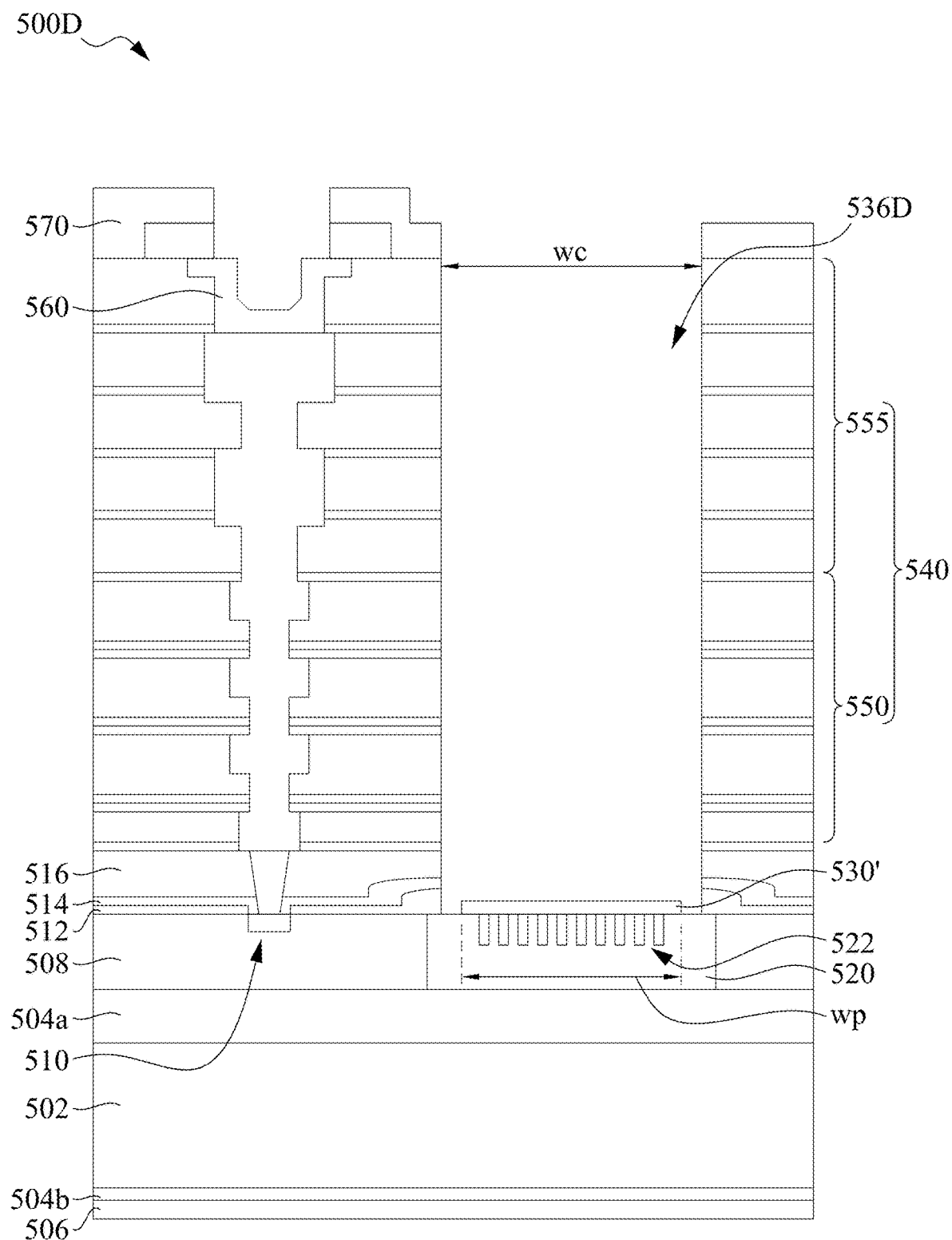

FIG. 5D is a cross sectional view of a chip 500D in accordance with some embodiments. The chip 500D is similar to the chip 500C (FIG. 5C). In comparison with the chip 500C, the chip 500D includes cavity 536D which extends through an entirety of the interconnect structure 540, an entirety of the ILD 516, an entirety of the CESL 514, an entirety of the oxide layer 512 to expose portions of the waveguide layer 520 and the grating 522 that extend beyond an edge of the polysilicon layer 530'. A portion of the polysilicon layer 530' remains over the waveguide layer 520 and the grating 522.

Figure 5E:
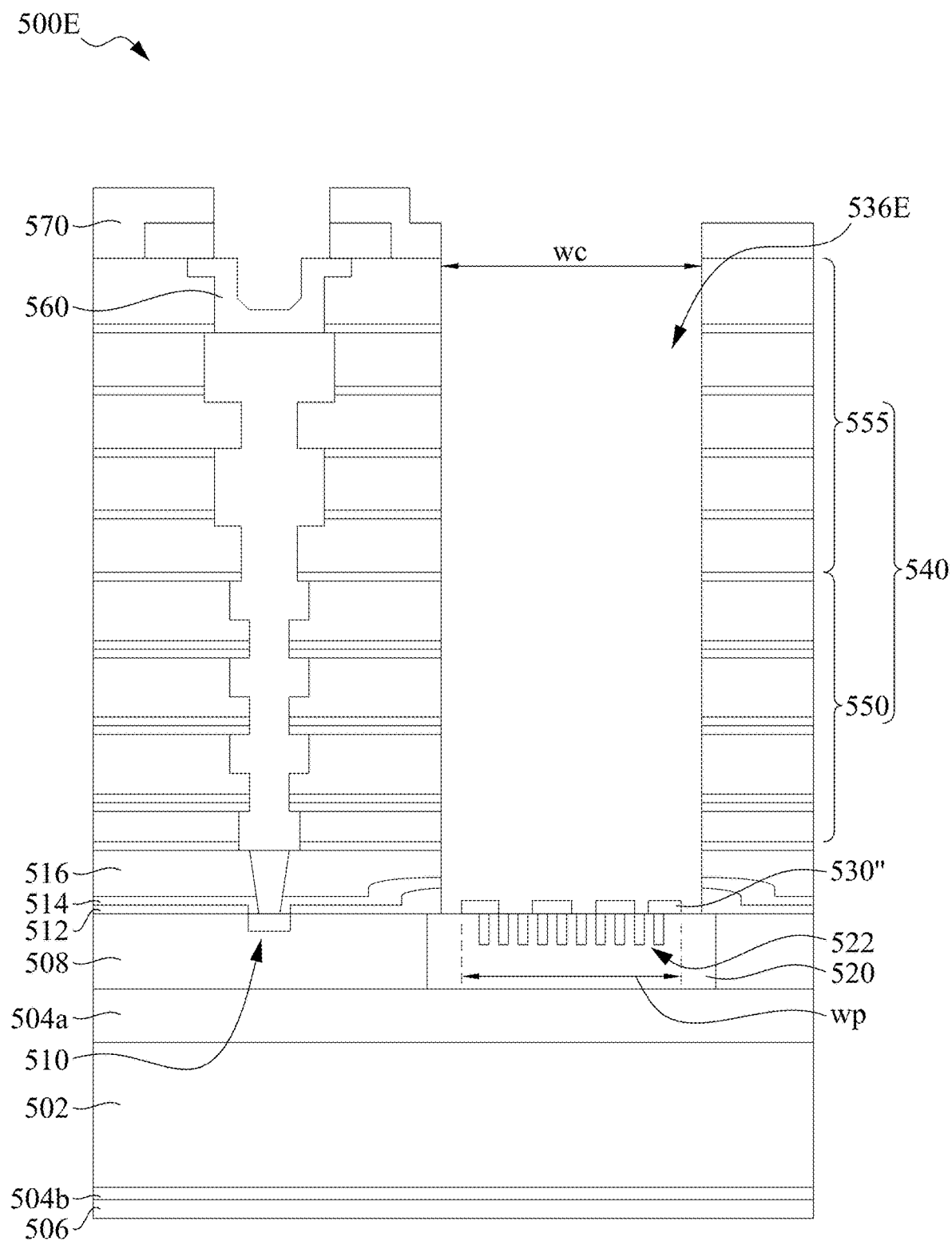

FIG. 5E is a cross sectional view of a chip 500E in accordance with some embodiments. The chip 500E is similar to the chip 500D (FIG. 5D). In comparison with the chip 500D, the chip 500E includes a segmented polysilicon layer 530". During the formation of the chip 500E, the polysilicon layer 530' is etched to define openings to form the segmented polysilicon layer 530". Removing these portions of the polysilicon layer 530' increases an amount of the waveguide layer 520 and the grating 522 exposed. Thus, an amount of the waveguide layer 520 and the grating 522 able to receive the optical signal without absorption from other materials is increases. As a result, efficiency of optical coupling between the optical fiber and the waveguide layer 520 is increased. In some embodiments, the segmented polysilicon layer 530", as a whole, occupies about 20% to about 30% of the cavity width wc of the cavity 536E. If the amount of the cavity width wc occupied by the segmented polysilicon layer 530" is too small, then a risk of over-etching increases because the etching tool is less likely to detect the presence of the segmented polysilicon layer 530" and terminate the etching process, in some instances. If the amount of the cavity width wc occupied by the segmented polysilicon layer 530" is too great, then an amount of light from the optical signal that is absorbed or dispersed by the segmented polysilicon layer 530" increases and coupling efficiency is reduced, in some instances. While the segmented polysilicon layer 530" is only shown with respect to a cavity that extends all the way to the segmented polysilicon layer 530", one of ordinary skill in the art would recognize that the segmented polysilicon layer 430" is usable with any of the embodiments in FIGS. 5A-5C.

The examples of chips 500A-500E (FIGS. 5A-5E) result from different etching depths for the cavities 536A-536E. In some embodiments, due to manufacturing variation, different chips on a same wafer will have cavities from the different examples in FIGS. 5A-5E. For example, in some embodiments, chips on the wafer closer to an edge of the wafer are more likely to have cavities which extend farther into the chip than chips near a center of the wafer.

Figure 6:
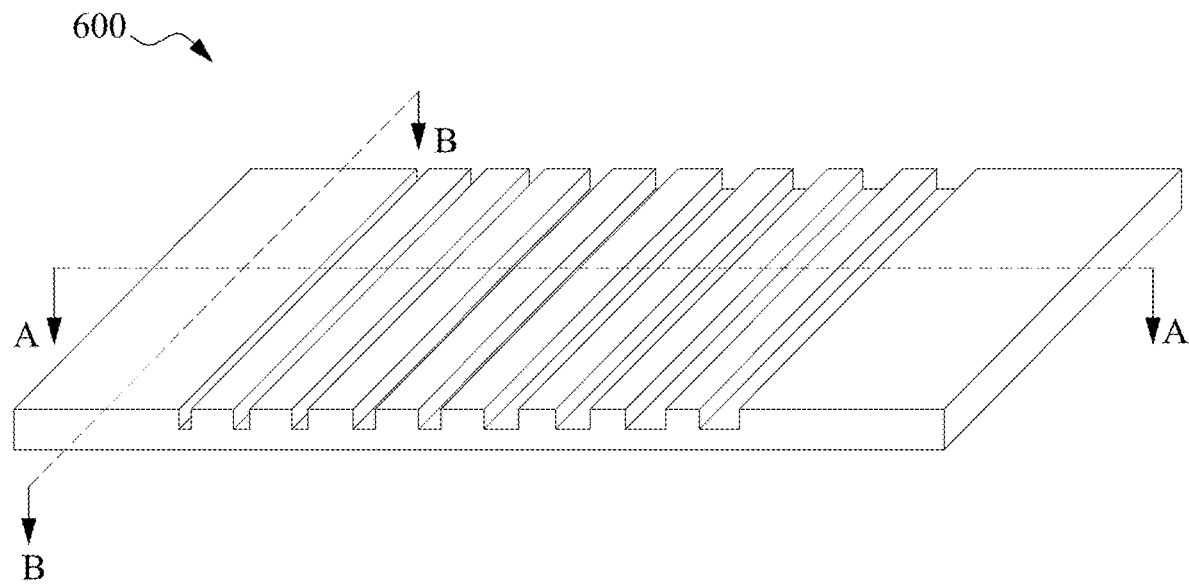
FIG. 6 is a perspective view of a grating in accordance with some embodiments.

FIG. 6 is a perspective view of a grating 600 in accordance with some embodiments. Grating 600 is usable as grating 140 (FIG. 1) in some embodiments. The gratings 140, 422 and 522 (FIGS. 1, 4A-4G and 5A-5E) are cross sectional views of the grating 600 taken along line A-A, in some embodiments. Grating 700 (FIG. 7) is a cross sectional view of the grating 600 taken along line B-B.

Figure 7:
FIG. 7 is a cross sectional view of a grating in accordance with some embodiments.

FIG. 7 is a cross sectional view of a grating 700 in accordance with some embodiments. The grating includes a substrate 780. Substrate 780 is similar to substrate 122 (FIG. 1). A first reflection layer 790 is over the substrate 780. A first oxide layer 782 is over the first reflection layer 790. A waveguide layer 724 is over the first oxide layer 782. The waveguide layer 724 is similar to the waveguide layer 124. A cladding layer 770 is over the waveguide layer. A second reflection layer 792 is over the cladding layer.

The first reflection layer 790 reflects light from an optical signal back toward a top surface of the grating 700 in order to prevent the light from being lost into the substrate 780. In some embodiments, the first reflection layer 790 includes aluminum, copper, nickel, alloys thereof, or another suitable material. In some embodiments, a thickness of the first reflection layer 790 ranges from about 0.1 µm to about 10 µm. If the thickness of the first reflection layer 790 is too small, a risk of light from the optical signal escaping the grating 700 increases, in some instances. If the thickness of the first reflection layer 790 is too great, material is wasted without a noticeable improvement in performance, in some instances.

The first oxide layer 782 supports the waveguide layer 724 and has a different refractive index from the waveguide layer 724. The difference in refractive index helps to reflect light from the optical signal back into the waveguide layer 724 during propagation of the optical signal along the waveguide layer 724. In some embodiments, the first oxide layer 782 has a thickness ranging from about 500 nm to about 3,000 nm. If the thickness of the first oxide layer 782 is too small, then a risk of light penetrating through the first oxide layer 782 increases, in some instances. If the thickness of the first oxide layer 782 is too great, then material is wasted without a noticeable improvement in performance in some instances. In some embodiments, the first oxide layer 782 contains a material other than silicon oxide, such as silicon nitride, aluminum oxide, hafnium oxide or another suitable material.

The cladding layer 770 helps to reflect light from the optical signal back into the waveguide layer 724 similar to the first oxide layer 782. In some embodiments, a thickness of the cladding layer ranges from about 0.6 µm to about 3 µm. If the thickness of the cladding layer 770 is too small, then a risk of light penetrating through the cladding layer 770 increases, in some instances. If the thickness of the cladding layer 770 is too great, then material is wasted without a noticeable improvement in performance in some instances. In some embodiments, the cladding layer 770 contains silicon oxide, silicon nitride, aluminum oxide, hafnium oxide or another suitable material. In some embodiments, the cladding layer 770 contains a same material as the first oxide layer 782. In some embodiments, the cladding layer 770 contains a different material from the first oxide layer 782.

The second reflection layer 792 reflects light from the optical signal back toward a bottom surface of the grating 700 in order to prevent the light from being lost out of the grating 700. In some embodiments, the second reflection layer 792 includes aluminum, copper, nickel, alloys thereof, or another suitable material. In some embodiments, the second reflection layer 792 contains a same material as the first reflection layer 790. In some embodiments, the second reflection layer 792 contains a different material from the first reflection layer 790. In some embodiments, a thickness of the second reflection layer 792 ranges from about 0.1 µm to about 10 µm. If the thickness of the second reflection layer 792 is too small, a risk of light from the optical signal escaping the grating 700 increases, in some instances. If the thickness of the second reflection layer 792 is too great, material is wasted without a noticeable improvement in performance, in some instances. In some embodiments, the thickness of the second reflection layer 792 is different from the thickness of the first reflection layer 790. In some embodiments, the thickness of the second reflection layer 792 is equal to the thickness of the first reflection layer 790. In some embodiments, the second reflection layer 792 is only over portions of the waveguide layer 724 that does not include a grating in order to maximize the transmission of the optical signal, e.g., the optical signal 115 (FIG. 1), to the grating for transmission along the waveguide layer 724.

An aspect of this description relates to a coupling system. The coupling system includes an optical fiber configured to carry an optical signal. The coupling system further includes a chip in optical communication with the optical fiber. The chip includes a substrate. The chip further includes a grating on a first side of the substrate, wherein the grating is configured to receive the optical signal. The chip further includes an interconnect structure over the grating on the first side of the substrate, wherein the interconnect structure defines a cavity aligned with the grating. The chip further includes a first polysilicon layer on a second side of the substrate, wherein the second side of the substrate is opposite to the first side of the substrate. In some embodiments, the chip further includes a second polysilicon layer over the grating, wherein the second polysilicon layer is between the interconnect structure and the grating. In some embodiments, the second polysilicon layer directly contacts the grating. In some embodiments, a width of the second polysilicon layer is greater than a width of the cavity. In some embodiments, a width of the second polysilicon layer is less than a width of the cavity. In some embodiments, the width of the second polysilicon layer is about 20% to about 30% of the width of the cavity. In some embodiments, the second polysilicon layer is a segmented polysilicon layer. In some embodiments, the chip includes an oxide layer over the grating, and the oxide layer is between the grating and the interconnect structure. In some embodiments, the cavity extends beneath the oxide layer to define a recess in a bottommost surface of the oxide layer. In some embodiments, the cavity exposes at least a portion of the grating. In some embodiments, the cavity fails to expose any of the grating.

An aspect of this description relates to a chip. The chip includes a substrate. The chip further includes a waveguide layer on a first side of the substrate. The chip further includes a grating optically connected to the waveguide layer. The chip further includes an interconnect structure on the first side of the substrate, wherein the waveguide layer is between the interconnect structure and the substrate, and the interconnect structure defines a cavity aligned with the grating. The chip further includes a first polysilicon layer over the grating on the first side of the substrate. The chip further includes a second polysilicon layer on a second side of the substrate, wherein a maximum thickness of the first polysilicon layer is equal to a maximum thickness of the second polysilicon layer. In some embodiments, a width of the first polysilicon layer is greater than a width of the cavity. In some embodiments, a width of the first polysilicon layer is less than a width of the cavity. In some embodiments, the first polysilicon layer is a segmented polysilicon layer. In some embodiments, the cavity exposes the first polysilicon layer. In some embodiments, the chip further includes a dielectric layer over the first polysilicon layer, wherein the dielectric layer is between a bottommost surface of the cavity and the first polysilicon layer.

An aspect of this description relates to a method of making a chip. The method includes depositing a first polysilicon layer on a top surface and a bottom surface of a substrate. The method further includes patterning the first polysilicon layer to define a recess, wherein the first polysilicon layer is completed removed from the recess. The method further includes implanting dopants into the substrate to define an implant region. The method further includes depositing a contact etch stop layer (CESL) in the recess, wherein the CESL covers the implant region. The method further includes patterning the CESL to define a CESL block. The method further includes forming a waveguide and a grating in the substrate. The method further includes forming an interconnect structure over the waveguide, the grating and the CESL block. The method further includes etching the interconnect structure to define a cavity aligned with the grating. In some embodiments, patterning the CESL further includes defining a CESL spacer parallel to a sidewall of the first polysilicon layer closest to the recess. In some embodiments, the method further includes depositing an oxide layer over the CESL block; patterning the oxide layer to define an oxide spacer along a sidewall of the CESL block; depositing a second polysilicon layer over the CESL block and the oxide spacer; and patterning the second polysilicon layer to define a polysilicon spacer along a sidewall of the oxide spacer.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A coupling system comprising:
an optical fiber configured to carry an optical signal; and
a chip in optical communication with the optical fiber, wherein the chip comprises:
   a substrate;
   a grating on a first side of the substrate, wherein the grating is configured to receive the optical signal;
   an interconnect structure over the grating on the first side of the substrate, wherein the interconnect structure defines a cavity aligned with the grating; and
   a first polysilicon layer on a second side of the substrate, wherein the second side of the substrate is opposite to the first side of the substrate.

2. The coupling system of claim 1, wherein the chip further comprises a second polysilicon layer over the grating, wherein the second polysilicon layer is between the interconnect structure and the grating.

3. The coupling system of claim 2, wherein the second polysilicon layer directly contacts the grating.

4. The coupling system of claim 2, wherein a width of the second polysilicon layer is greater than a width of the cavity.

5. The coupling system of claim 2, wherein a width of the second polysilicon layer is less than a width of the cavity.

6. The coupling system of claim 5, wherein the width of the second polysilicon layer is about 20% to about 30% of the width of the cavity.

7. The coupling system of claim 2, wherein the second polysilicon layer is a segmented polysilicon layer.

8. The coupling system of claim 1, wherein the chip comprises an oxide layer over the grating, and the oxide layer is between the grating and the interconnect structure.

9. The coupling system of claim 8, wherein the cavity extends beneath the oxide layer to define a recess in a bottommost surface of the oxide layer.

10. The coupling system of claim 1, wherein the cavity exposes at least a portion of the grating.

11. The coupling system of claim 1, wherein the cavity fails to expose any of the grating.

12. A coupling system comprising:
an optical fiber configured to carry an optical signal;
a substrate;
a waveguide layer on a first side of the substrate;
a grating optically connected to the waveguide layer, wherein the grating is configured to receive the optical signal;
an interconnect structure on the first side of the substrate, wherein the waveguide layer is between the interconnect structure and the substrate, and the interconnect structure defines a cavity aligned with the grating;
a first polysilicon layer over the grating on the first side of the substrate; and
a second polysilicon layer on a second side of the substrate, wherein a maximum thickness of the first polysilicon layer is equal to a maximum thickness of the second polysilicon layer.

13. The coupling system of claim 12, wherein a width of the first polysilicon layer is greater than a width of the cavity.

14. The coupling system of claim 12, wherein a width of the first polysilicon layer is less than a width of the cavity.

15. The coupling system of claim 12, wherein the first polysilicon layer is a segmented polysilicon layer.

16. The coupling system of claim 12, wherein the cavity exposes the first polysilicon layer.

17. The coupling system of claim 12, further comprising a dielectric layer over the first polysilicon layer, wherein the dielectric layer is between a bottommost surface of the cavity and the first polysilicon layer.

18. The coupling system of claim 2, wherein a maximum thickness of the first polysilicon layer is equal to a maximum thickness of the second polysilicon layer.

19. A coupling system comprising:
an optical fiber configured to carry an optical signal; and
a chip in optical communication with the optical fiber, wherein the chip comprises:
   a substrate;
   a grating on a first side of the substrate, wherein the grating is configured to receive the optical signal;
   an interconnect structure over the grating on the first side of the substrate, wherein the interconnect structure defines a cavity aligned with the grating; and
   a first polysilicon layer on a second side of the substrate, wherein the second side of the substrate is opposite to the first side of the substrate; and
   a second polysilicon layer on the first side of the substrate, wherein a maximum thickness of the first polysilicon layer is equal to a maximum thickness of the second polysilicon layer.

20. The coupling system of claim 19, wherein the second polysilicon layer is aligned with the grating.